United States Patent [19]
Hutchins et al.

[11] Patent Number: 5,568,465
[45] Date of Patent: Oct. 22, 1996

[54] READING FROM RECORD MEDIUM IN EITHER AN INVERTED OR NON-INVERTED SIGNAL-PROCESSING MODE

[75] Inventors: Robert A. Hutchins; Glen A. Jaquette, both of Tucson, Ariz.

[73] Assignee: International Business Machines Corporation, Armonk, N.Y.

[21] Appl. No.: 416,399

[22] Filed: Apr. 7, 1995

Related U.S. Application Data

[63] Continuation-in-part of Ser. No. 318,957, Oct. 6, 1994, abandoned.

[51] Int. Cl.$^6$ .................................................... G11B 7/00
[52] U.S. Cl. .............................. 369/124; 369/32; 369/47; 369/54; 369/58; 369/275.2
[58] Field of Search ................................ 369/32, 54, 58, 369/47, 124, 275.2

[56] References Cited

U.S. PATENT DOCUMENTS

| | | | |
|---|---|---|---|
| 4,831,611 | 5/1989 | Susaki et al. | 369/58 |
| 5,060,218 | 10/1991 | Chiyomatsu | 369/47 |
| 5,161,144 | 11/1992 | Takeuchi et al. | 369/54 |
| 5,202,877 | 4/1993 | Yanagida | 369/58 |
| 5,283,779 | 2/1994 | Otsuki | 369/275.2 |
| 5,309,420 | 5/1994 | Jaquette et al. | 369/58 |
| 5,430,702 | 7/1995 | Bish et al. | 369/58 |
| 5,432,762 | 7/1995 | Kubo et al. | 369/32 |

*Primary Examiner*—Georgia Y. Epps
*Assistant Examiner*—Kim-Kwok Chu
*Attorney, Agent, or Firm*—D. A. Shifrin; H. F. Somermeyer

[57] ABSTRACT

In a write-once read-many (WORM) optical disk device recorded unipolar pulse signals having a high lineal recorded densities are read back using an inverted analog signal processing channel that processes the read back signal after polarity inversion of the read back signal. Some fields in each sector of an optical disk are recorded at a specific maximal mark density pattern. Read back of such fields is signal processed using non-inverted read back analog signal processing, i.e. the read back unipolar pulse signal is processed without polarity inversion. In the non-inverted read back, automatic gain control of the read signal is turned off such that amplification of the read back signal is at a constant gain. Also during non-inverted read back, low read back signal amplitude results in degating the read back output. These signal processing techniques produce a pulse stream which can be further processed by a circuit which qualifies acceptable time intervals and a counter to robustly determine whether the field has been written. Digital signal processing provides signal detection with or without read back signal inversion while maintaining robust flag signal detection. Digital automatic gain control is effected to an acceptable range of signal amplitudes either continuously, on a sector basis, detected error basis or session basis.

53 Claims, 8 Drawing Sheets

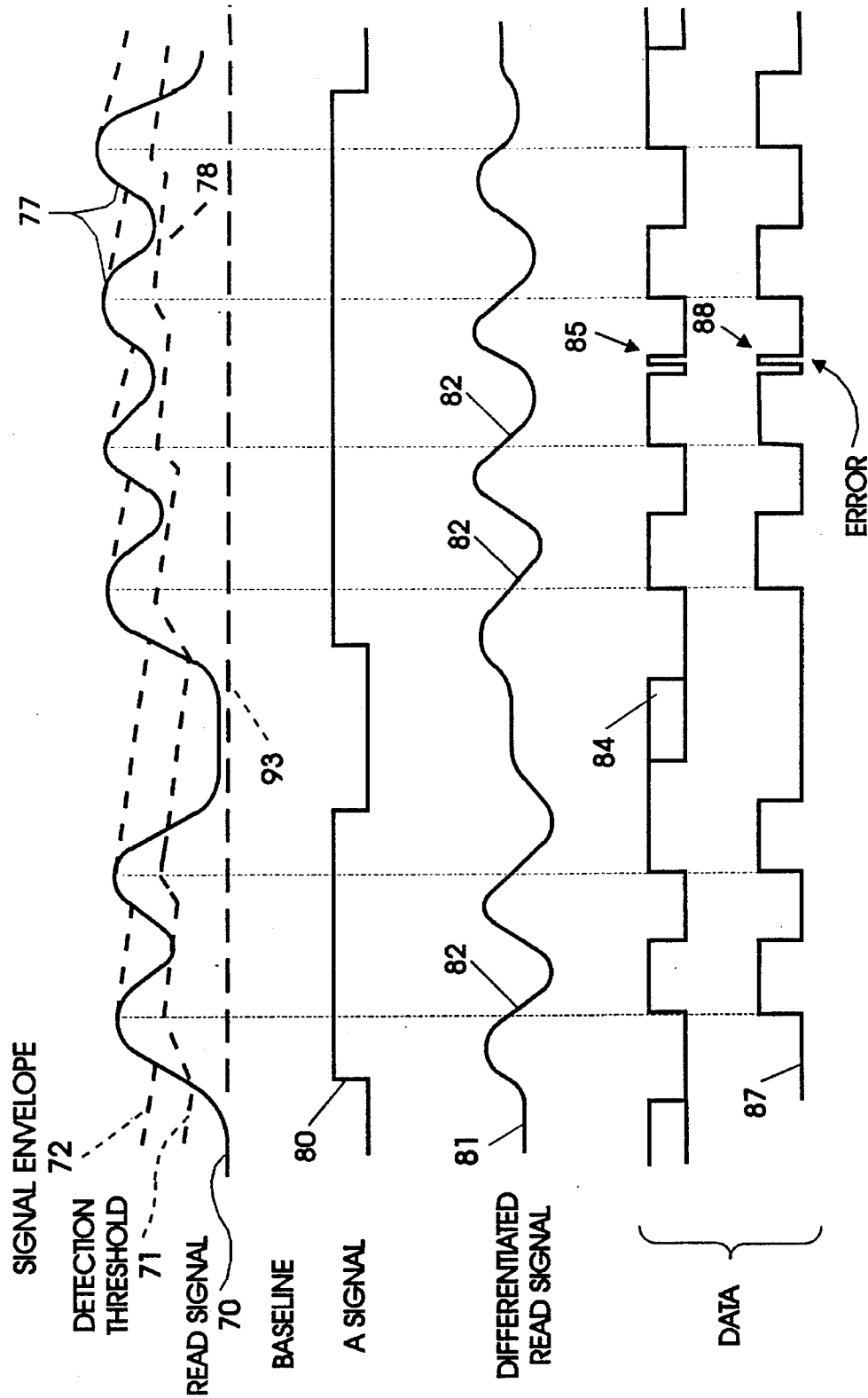

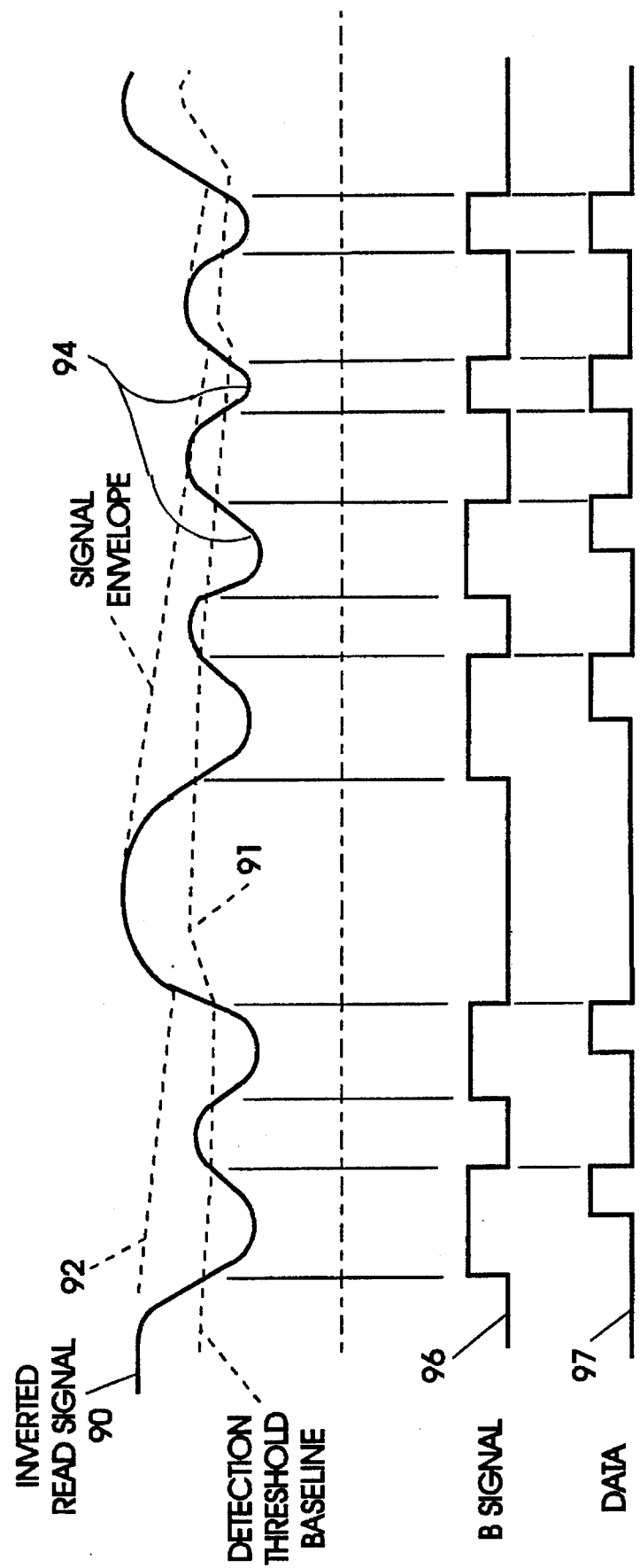

READING FROM RECORD MEDIUM IN EITHER AN INVERTED OR NON-INVERTED SIGNAL-PROCESSING MODE

RELATED APPLICATION

This application is a continuation-in-part of Ser. No. 08/318,957, filed Oct. 6, 1994, now abandoned.

DOCUMENT INCORPORATED BY REFERENCE

U.S. Pat. No. 5,315,284 to Bentley et al. is incorporated by reference for showing an arrival time estimation circuit.

FIELD OF THE INVENTION

The present invention relates to signal processing circuits, more particularly to those signal processing circuits employed for read back from a record member, such as an optical disk, wherein the recognition of a predetermined high frequency pattern written into a certain control field is critical for preventing any inadvertent overwrite of user or other data.

BACKGROUND OF THE INVENTION

Customer or user data are recorded on optical disks as marks written at high lineal densities into records within sectors in the optical disks. While customer data are recorded at a given lineal density, the frequency of marks recorded on optical disks varies in accordance with the (d,k) constraints of the run length limited (RLL) codes. Some format or control fields of the sectors specified in known optical disk standards are written into with a given high mark density pattern. One of these fields is the flag field called out by the American National Standards Institute (ANSI) standard for unbanded write-once read-many (WORM) media. Once recorded, a high mark density field, such as a flag field, is read back into a pulse stream which has a given high frequency of pulses corresponding to the given high mark density. A purpose of the flag field is to provide a control for preventing overwriting user data. In particular, this invention deals with high reliability signal detection techniques for detecting a relatively short high mark density pattern. This invention enables faithfully detecting each flag field to allow protection of customer data from inadvertent overwrite.

The American National Standards Institute (ANSI) standard for unbanded WORM optical disk define this flag field in each sector on the disk. The sector topology of this standard was broadened by IBM. Such broadened topology is incorporated by IBM into formats for radially-banded WORM media. Each flag field is disposed between a sector's embossed identification (ID) field and the customer/user data field. The flag field is written into only when data has been written into the customer data field of the sector. In write-once media, such flag field recording indicates that the sector has been written to and is now a 'read only' sector. That is, writing to a previously written sector is prohibited to prevent obliterating the previously written data. Also, in ablative WORM media that is grooved to indicate track location, such over-writing of written data may totally obliterate the raised track (land) between the grooves into which the marks are recorded. This additional ablation makes such groove optically indistinguishable from the adjacent grooves, thereby degrading track following over this sector. Such over ablation also degrades track seeking in which a laser beam happens to traverse this over-ablated sector.

Writing data to a WORM optical disk may require two disk rotations. A first disk rotation reads the flag field for verifying that no high mark density pattern has been written in this format field and then proceeds to write the customer data field if the flag field is blank, indicating an unwritten sector. A second disk rotation then writes the high mark density pattern in the flag field followed by a verification the customer data field has been written satisfactorily. The sector ID is usually embossed in a leading portion of the sector using the same high lineal density RLL coding as the written data is recorded at. For ensuring that no written data is inadvertently overwritten, detection of the flag field must be robust and accurate.

Further, WORM devices typically scan the WORM disk for finding a first unwritten sector, this operation being referred to as a medium scan operation. That is, WORM disks are typically partitioned in such a way that sectors will be written to sequentially by an application such that a first unallocated sector is the first of many unwritten sectors. This so-called medium scan uses flag field indications, in addition to checks performed on the customer data fields, to determine whether a sector has been written to. Therefore, it is important to robustly read each flag field to ensure there is no signal misdetection leading to an incorrect indication of a first unwritten sector. This error can occur if either a written flag field is missed or a blank flag field is falsely detected as being written. In the former case, a sector which has a flag field protecting a customer data field that is marginal (e.g. obstructed by a media defect or written at a very low power) and which may not be detected by the media scan can be sensed as being blank (unrecorded). In the latter case, false detection of a flag field which is actually blank and which precedes an unused customer data field (i.e. the sector is blank) can cause the medium scan operation to decide that a second blank sector is the first sector available for use, causing a blank sector to be left among the written sectors. If a subsequent medium scan operation correctly determines this sector is blank, a multiple sector write may be initiated starting at this sector. The attempted write of the second sector of this multiple sector operation is actually attempt to overwrite the previously written sector. If this write is not aborted by proper detection of the flag field, customer data will be overwritten and lost.

Embossed sector ID's may be faulty resulting in unreliable read back from the disk. That is, one device could read a given sector ID while another device fails to read the same sector ID. Also, data for storage in sectors may be reassigned because of some marginal operating condition, i.e. a faulty ID or a media defect. Media defects may appear as signals, particularly in ablative WORM media. Further, diverse manufacturers may have diverse criteria for qualifying sectors before writing to a sector. In any event, accurately and robustly detecting whether the flag field has been recorded measurably improves medium scanning reliability and is necessary for reliable WORM data recording operations.

To prevent unintended data overwriting in a WORM medium, read back signal processing of the flag field must robustly detect whether the high mark density pattern has been recorded therein. The read back circuits distinguish between real signals and noise induced by scanning unwritten areas of the disk. Typically, read back signal processing for sector ID's immediately preceding each flag field requires detection of all read back signals of embossed indicia for ensuring accurately accessing addressed sectors. Reliable detection of sector IDs and customer data field at high lineal densities, such as used in optical recording, requires read equalization to boost the higher frequency readback signal components. Read equalization reduces the dynamic range of the signal (ratio of high to low frequency signal amplitudes) and cancel inter-symbol interference (ISI). Read equalization which boosts high frequencies tends to shape media noise "readback" when scanning an unwritten sector in such a way that an unqualified peak detector would generate a high frequency pulse stream easily confused with the readback pulse stream resulting from a high mark density pattern such as is written to the flag field. Therefore, a later described qualified-peak detector should be used in data read channels.

Further, for reliably reading high lineal density unipolar recorded signals a so-called inverted read channel is used for enhancing reliability of reading such written high-lineal-density signals. Such an inverted read channel operation simplifies peak following and qualification threshold generation. The readback signal peak qualification allows the read detector to reliably sense high mark density patterns within run-length-limited (RLL) encoded data that is not ideally written resulting in undesired low peak-to-peak amplitude readback. Such a channel rejects the DC component of the readback in favor of sensing signal peaks of the read back signal. Therefore, such an inverted read channel more reliably reads the high lineal density signals written in accordance with the (d,k) constraints of an RLL code than a usual non-inverted qualified peak detector. Such an inverted read channel does not reliably distinguish between the high mark density pattern written into a flag field and media noise shaped by read equalization. Therefore, for acceptable operation on WORM media, the read detection of the optical disk player must provide robust detection of both random data recorded at high lineal densities in accordance with known (d,k) RLL code and control information written into the flag field at a given high mark rate or pulse repetitive frequency.

DISCUSSION OF PRIOR ART

U.S. Pat. No. 4,831,611 Sasaki et al shows an optical writing and reading method for reading a mark to prevent over writing written data on an optical disk. Reading the mark is effected by momentarily stepping the laser beam power from a low or read level to a write level. The reflected light is analyzed. If the reflected light is high, then the sector is not written to. If the reflected light is low, then the sector has written data and is not to be written to. Such a technique enables a one pass write. Such ablation of the mark is continuous, possibly creating over ablation in the mark area. In contrast, the industry standards now require the high mark density pattern to be recorded into the flag field for indicating whether or not the sector has previously been written to.

U.S. Pat. No. 5,060,218 Chiyomatsu shows record mark that upon read back produces a high amplitude signal. Such signal is amplitude compared with a reference for indicating whether or not a sector has been previously written to. Such a system requires careful calibration to overcome known error conditions associated with amplitude only systems for an area that is crucial to data integrity.

U.S. Pat. No. 5,162,144 Takeuchi et al detects a mark by using a counter to count data in a mark area. If a predetermined count is reached, then writing is inhibited. A simpler system is desired for lower cost implementation and greater reliability and data integrity.

U.S. Pat. No. 5,202,877 Yanagida detects that a sector has been written to by detecting absence or presence of a data clock synchronization burst followed by recorded data. Detection of the clock and data writing inhibits further writing in the sector.

SUMMARY OF THE INVENTION

The present invention provides for robustly processing the flag field of WORM optical disks which are recorded as high mark density patterns. The specific implementation discussed relates to detection of flag fields written in either the unbanded (1X a base capacity) or banded (2X—indicating twice the base capacity) industry standards for WORM disks which utilizes a pulse position modulation (PPM) data recording to the disk. The 2X capacity is achieved using a modified constant angular velocity radially zoned recording. The read back from PPM recording produces a unipolar signal. However, the signal processing concepts are extensible to detection of a class of signals which on readback can be characterized as having high frequency modulation on top of a baseline pulse. While this is inherent in flag fields recorded using PPM encoding, it is also characteristic of pulse width modulation (PWM) tones, such as those tones described in the known so-called 4X proposed standard for WORM media.

According to the invention, signal processing in an optical disk device uses an inverted read back channel for reliable detection of unipolar pulses recorded at high lineal densities. After processing of each sector ID is completed, the read channel is switched over to a non-inverted qualified signal peak detector for reliably processing a next-sensed flag field. The non-inverted processing allows a signal's baseline or DC content to play a significant role in peak qualification, whereas the inverted signal processing largely ignores a signal's baseline content. The inverted signal processing inverts the polarity of the incoming signal relative to a DC restore circuit operation such that signal peaks closer to the restored value are qualified.

In another aspect of the invention, peak qualification of the flag field can be performed more reliably when a constant gain amplifier is used to amplify the signal being processed instead of an automatic gain controlled (AGC) variable amplification used for reliable detection of sector IDs and customer data fields. In the usual non-inverted signal detector, a flag field can be reliably detected if the signal gain during detection is fixed to the gain requirements determined earlier by the AGC for processing an embossed ID that precedes the flag field. Use of the gain setup by the AGC in the sector identification (ID) calibrates the signal amplitude to a fixed threshold for reliably degating noise which does not have the baseline signal content characteristic of a recorded high mark density pattern, such as is written into the flag field.

In a specific aspect of the invention, all unipolar pulses read from an optical disk having a high lineal recording density, such as an optical write-once disk, are processed using the inverted signal processing except for processing unipolar pulses read from areas of the disk, such as from a flag field, that are preferably read using the standard or non-inverted signal processing. Read back channel operations are switched between the two modes during processing of all sectors, such as where robust flag field detection is desired.

The pulse stream resulting from a flag field which is detected in this way is reliably processed into a robust indication of flag field presence via time qualification and counters. This detection changing method and apparatus is usable for robust signal detection of given signals having diverse characteristics from signals being processed immediately before tile given signals are to be processed.

The foregoing and other objects, features and advantages of the invention will be apparent from the following more particular description of preferred embodiments of the invention, as illustrated in the accompanying drawings.

DESCRIPTION OF THE DRAWING

FIGS. 4 and 5 respectively show unipolar pulse derived signals being processed in a non-inverted and an inverted read back channel.

DETAILED DESCRIPTION

Figure 1:
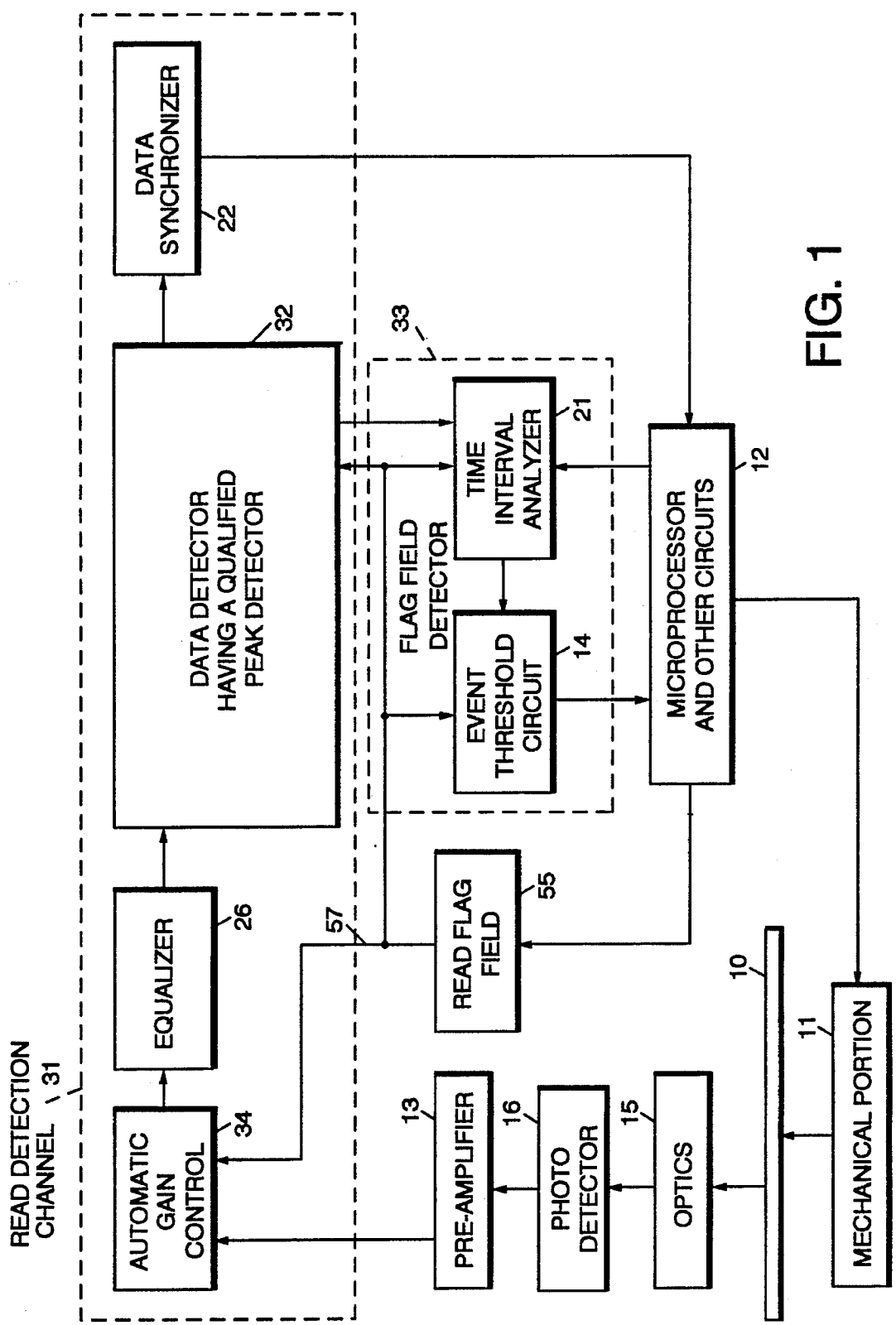
FIG. 1 illustrates a read back signal processing channel for unipolar pulses used in a write-once read-many optical disk device in which the invention is advantageously practiced.
Figure 2:
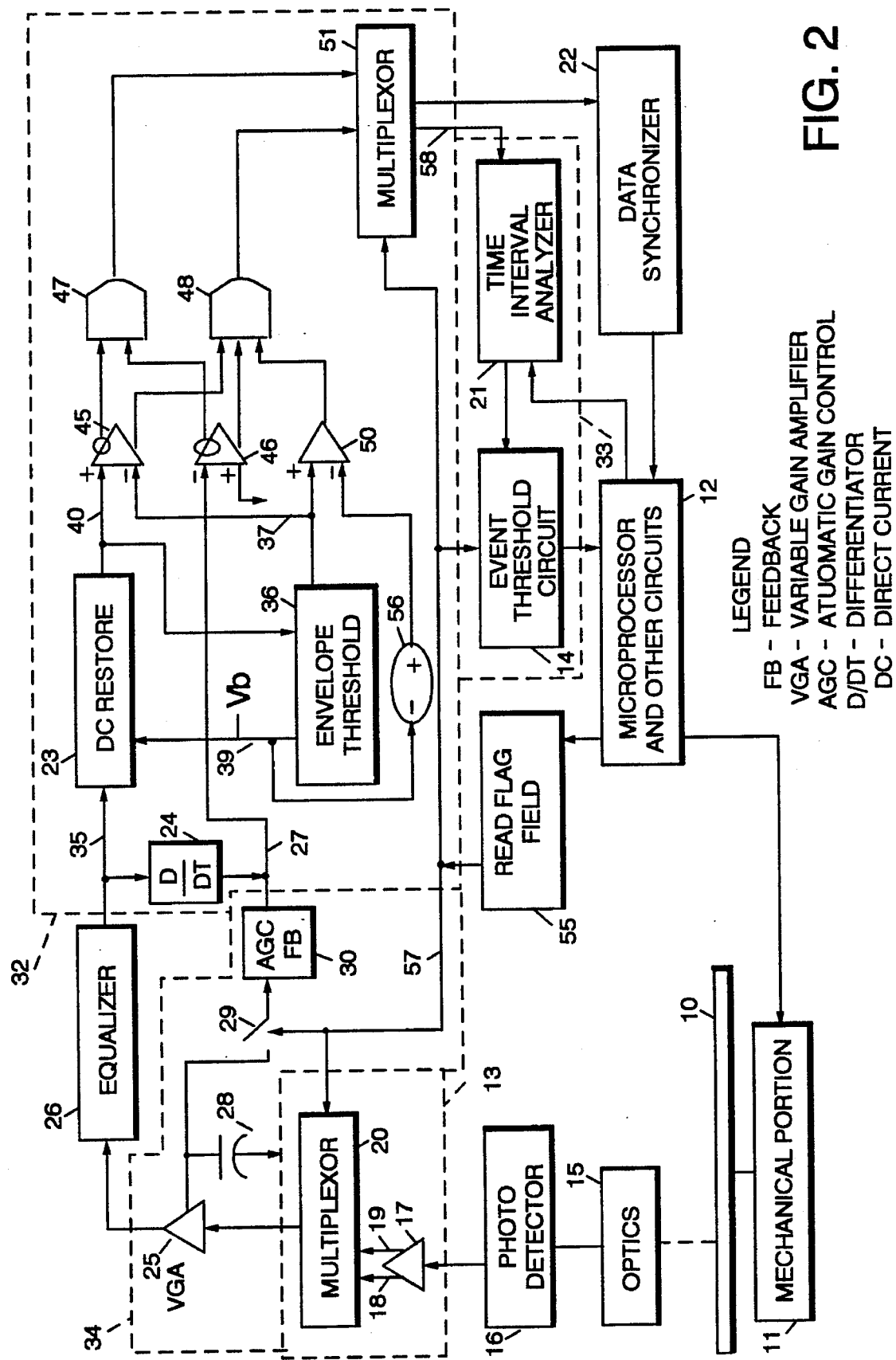
FIG. 2 illustrates a so-called analog embodiment of the FIG. 1 illustrated read back signal processing channel.
Figure 3:
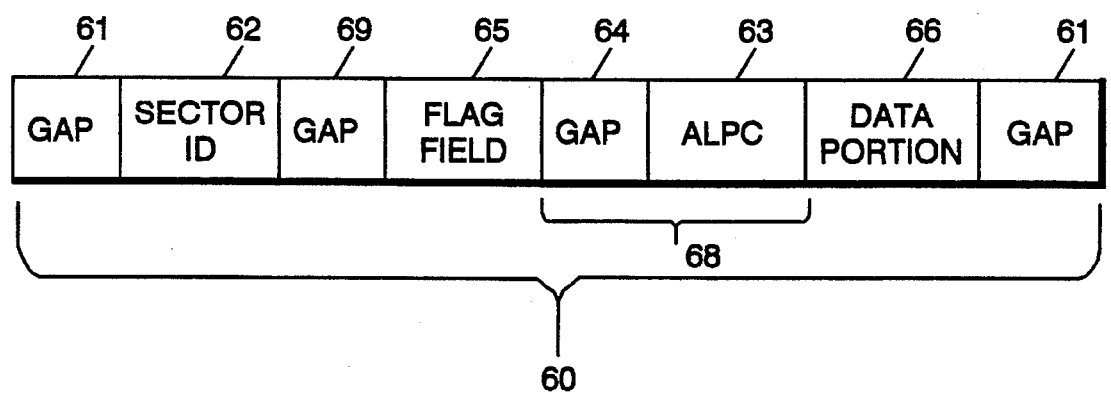
FIG. 3 is a simplified schematic showing of a sector in a disk used in the FIG. 1 illustrated optical disk device.
Figure 8:
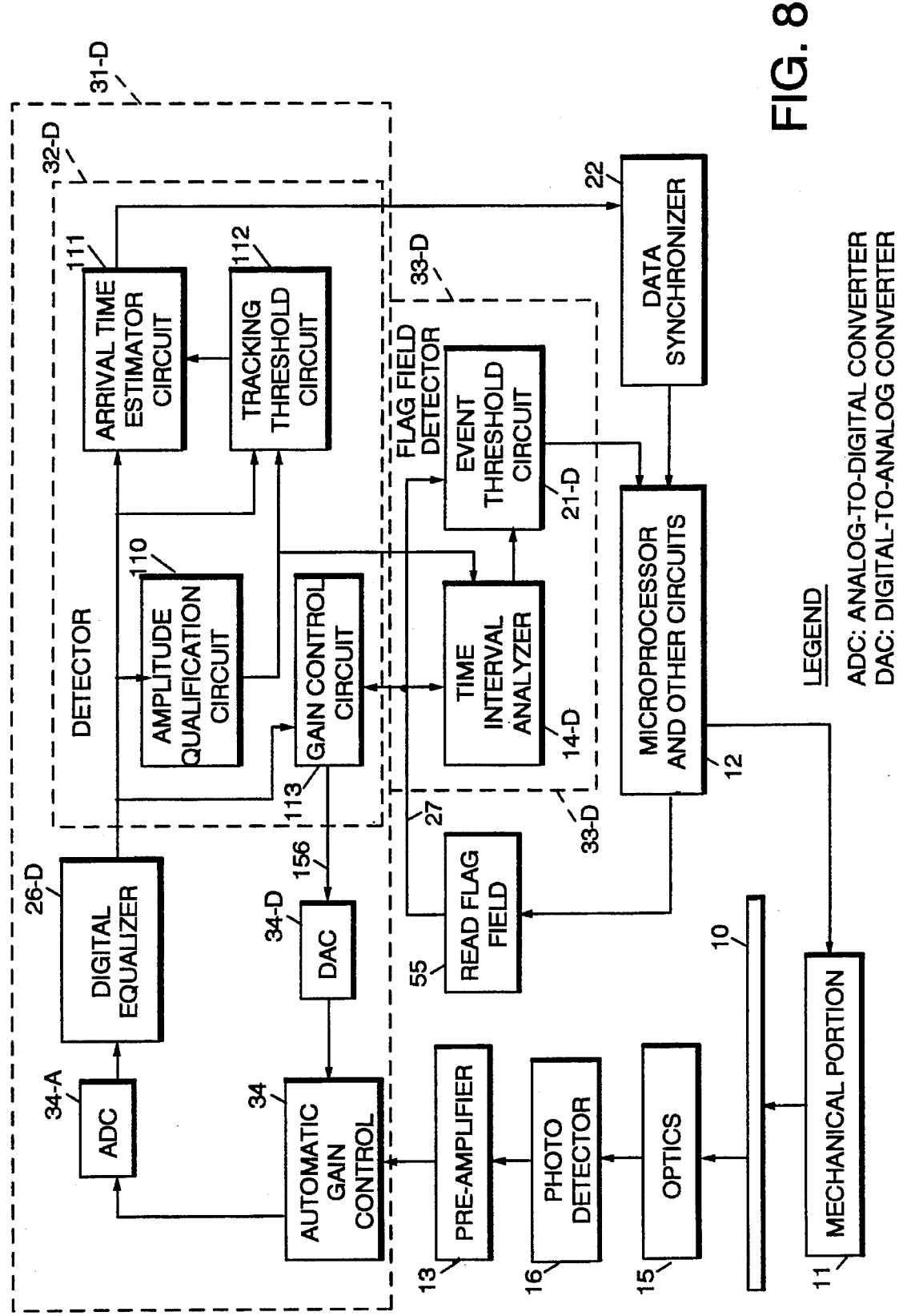
FIGS. 8 and 9 are simplified block diagrams showing a so-called digital circuit embodiment of the FIG. 1 illustrated read back signal processing channel.

Referring now more particularly to the appended drawing, like numerals indicate like parts and structural features in the various figures. First, as shown in FIGS. 1, 2 and 8, write-once read-many (WORM) optical disk 10 has signals recorded thereon as written marks in a track of disk 10. Mechanical portion 11 includes the usual support for rotation of disk 10, means for moving optics 15 relative to disk 10 and the like. Other circuits and microprocessor 12 includes all those circuits for building an optical disk device, all as is known. Reading back the written signals is achieved through usual optics 15 (includes a laser, an objective lens plus the usual beam splitters, etc.) The laser beam reflected and modulated by the recorded and embossed marks on disk 10 travel through optics 15 to impinge on photo-detector 16 as a source of signals to be processed. The photo-current of photo-detector 16 is converted by transimpedance pre-amplifier 13 to voltage signals, as best seen in FIGS. 3 and 4.

Pre-amplifier 13 responds to the photo detector 15 circuit signal stimuli to produce a switched bi-polar signal for selectively generating either an inverted signal or a non-inverted signal to read detection channel 31. In read detection channel 31, automatic gain control circuit 34 responds to the pre-amplifier 13 signal for applying automatic gain control thereto. As seen in FIG. 2, signal amplifier 17 provides a differential output signal that travels over lines 18 and 19 to signal-output polarity-selecting multiplexor 20. The non-inverted readback signal on line 18 looks substantially similar to read signal 70 of FIG. 4 to a certain unipolar stimulus. The inverted readback signal on line 19 looks substantially similar to read signal 90 of FIG. 5 to the same unipolar stimulus. The polarities of the signals 70 and 90 are opposite. In signal 70 maximum amplitude peaks 75 and 77 indicate binary 1 data while in signal 90 minimum amplitude peaks 94 indicate binary 1 data. As will become apparent, multiplexor 20 receives the differential signal on lines 18 and 19 and outputs the signal in one polarity orientation or the other on to automatic gain control circuit 34 (FIG. 1).

Automatic gain control circuit 34 has variable gain amplifier VGA 25 (FIG. 2). VGA 25 amplifies the selected polarity readback signal before supplying it to usual read equalizer 26. Equalizer 26 accentuates high frequency content of the readback signal within the bandwidth of the recording channel and band limits noise by rolling off frequencies beyond the bandwidth of the recording channel. The output signal of equalizer 26 travels over line 35 to detector 32. Detector 32 has a later-described qualified peak detector. Line 35 carries its signal to DC restore circuit 23 of read detector 32 and to signal derivative block D/DT 24. For generating a DC restored signal on line 40, DC restore circuit 23 restores reference baseline Vb on line 39 to the line 35 equalized analog read back signal.

The detector 32 qualified peak detector portion, described below, uses AND circuits 47 and 48 to supply detected signal peak indicating transitions derived from inverted and non-inverted analog read back signals, respectively. Envelope threshold circuit 36 supplies a read-back single-amplitude-qualifying threshold signal 71 (FIG. 4) over line 37 to switching comparators 45 and 50. This threshold signal also is a representation of the peak-to-peak amplitude of the DC restored signal on line 40. Envelope threshold circuit 36 generates the signal peak amplitude qualification signal 71 on line 37. First, envelope threshold circuit 36 envelope follows the DC restored signal of line 40 to generate signal 72 (FIG. 4). Second, envelope threshold circuit 36 averages envelope signal 72 with the reference baseline signal Vb (93 in FIG. 5) to produce the amplitude qualifying signal 71 on line 39.

To amplitude qualify the signal peaks of the DC restored signal on line 40 for both inverted and non-inverted signal detection, envelope threshold circuit 36 supplies signal peak amplitude qualification threshold signal 71 over line 37 to peak amplitude qualification comparator 45. Comparator 45 compares the line 40 carried DC restored signal peak amplitudes with the amplitude qualification signal on line 37 to emit a peak indicating signal to both AND circuits 47 and 48. AND circuit 47 responds to the comparator 45 supplied peak indicating signal and a later-described comparator 46 supplied derivative read back signal to emit a transition or logic pulse to multiplexor 51 for use in detecting a flag field signal. Similarly, for non-inverted signal detection, AND circuit 48 responds to the comparator 45 supplied peak amplitude qualified indicating signal, to the later-described comparator 46 supplied derivative signal and to comparator 50 peak-to-peak qualified signal to emit a logic pulse to multiplexor 51 for processing an non-inverted analog read back signal.

Comparator 45 has two logic outputs of opposite polarity. One output qualifies or passes the derivative analog read back signal 82 (FIGS. 4 and 5) received from comparator 46 for processing non-inverted analog read back signals to AND circuit 48. The comparator 45 other output signal enables AND circuit 47 to qualify or pass derivative information from comparator 46 for negative signal peaks on line 40 in inverted signal processing.

Differentiator block D/DT 24 of AGC circuit 34 (FIG. 2) outputs a signal on line 27 that is an analog derivative (differentiated) signal of the line 35 signal. Comparator 46 converts this line 27 analog derivative signal to a logic level. Derivative comparator 46 transitions or switches whenever the analog derivative signal on line 27 changes from positive to negative for indicating a local signal peak of the read back signal 70 from disk 10. The comparator 46 logic level output signals A 80 and B 96 go respectively to AND circuits 47 and 48.

Comparator 50 compares the line 37 peak-to-peak amplitude representing signal (the amplitude qualification signal) on line 37 with the output signal of voltage source 56. Voltage source 56 supplies a static voltage on at a fixed voltage amplitude above the reference baseline Vb amplitude on line 39. Comparator 50 supplies a gate opening and closing signal to AND circuit 48 such that the signal output of AND circuit 48 is degated when the peak-to-peak amplitude of the signal is too small. The output of AND circuit 48 is used for non-inverted peak detection of the signals read from flag field 65 (FIG. 3). Similarly, AND circuit 47 outputs a signal which has positive transitions corresponding to negative signal peaks that are more negative in amplitude than the amplitude qualification threshold. This output signal is used for inverted peak detection. Which of these two outputs is actually used is determined by a control signal on line 57 which controls which signal is passed by detector multiplexor 51 to line 58 connected to both data synchronizer 22 and time interval analyzer 21 in event threshold circuit 33.

Data synchronizer 22, uses only inverted signal processing. Data synchronizer 22 employs a usual data handling phase-locked loop (PLL) (not shown) to extract a clock from the pulse stream on line 58. The extracted clock signal times a synchronized data stream from data synchronizer 22 passing to data handling circuitry (not shown) for ID recognition and handling of data read from the customer data field.

Figure 9:
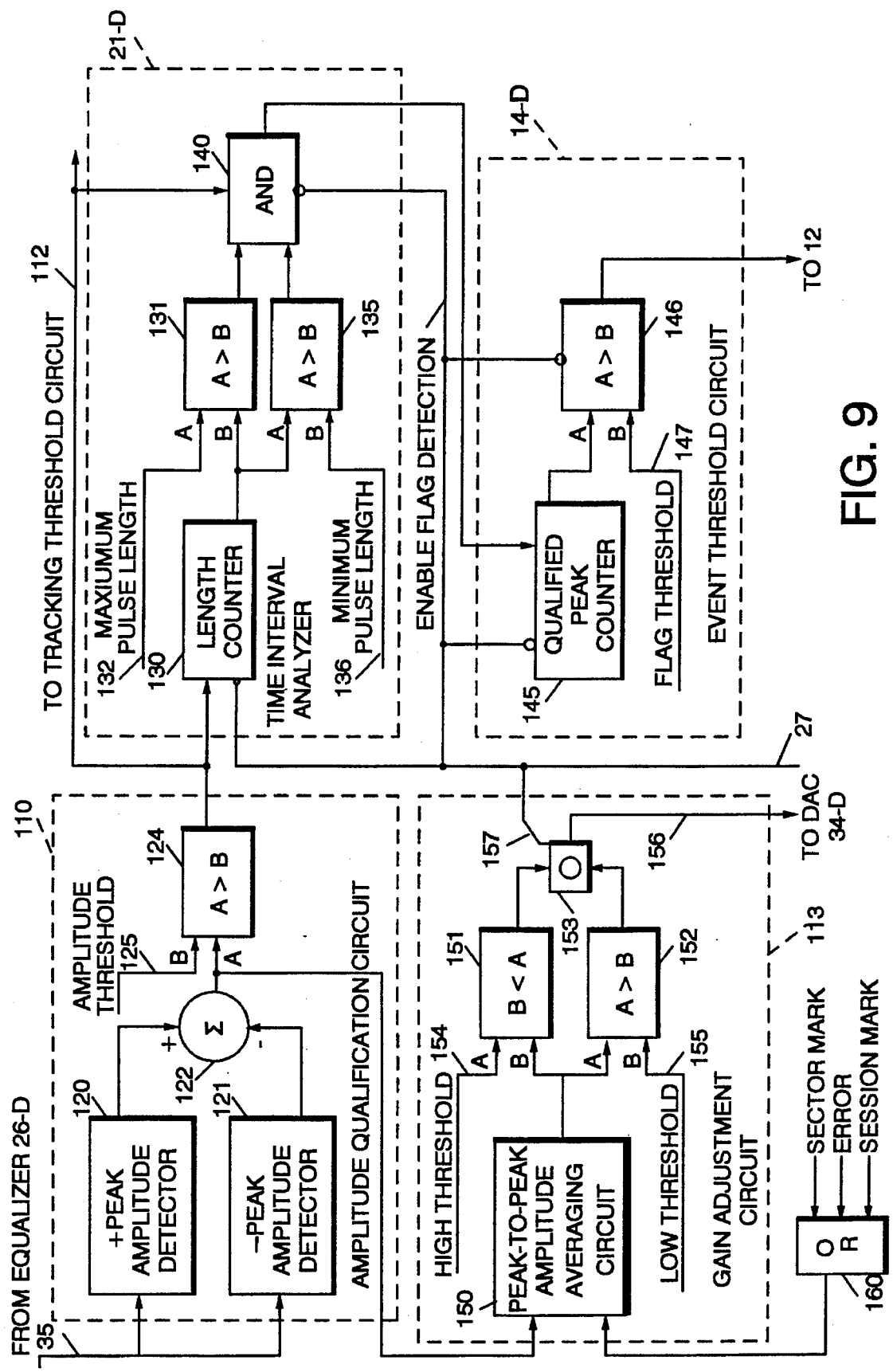

In non-inverted signal processing, time interval analyzer 21 degates pulses which do have the necessary timing relationship to correspond to the given high mark density flag field pattern. Pulses which meet the timing criteria established by time interval analyzer 21 are passed to event threshold circuit 14. A digital implementation of time interval analyzer 21 is shown in FIG. 9 and enumerated 21-D. The principles shown in FIG. 9 apply equally to FIGS. 1 and 2. Event threshold circuit 14 includes a counter 145 (see FIG. 9), as later described. Event threshold circuit 14 is controlled by the control signal on line 57 to count those non-inverted pulses which occur during the interval where the laser read spot (not shown) is scanning flag field 65. If a sufficient number of pulses are counted during this interval, it is determined that a flag field has been recorded, i.e. a flag is present. Other circuits or software function (not shown in FIG. 2) within microprocessor 12 analyze the output of event threshold circuit 14 and degate any writing of the customer data field if the flag field of that sector was determined to be written. In this way, inadvertent overwrite of a customer data field which follows a written flag field is prevented. Remember that comparator 50 provides a degate of positive peak detection when the peak-to-peak signal is insufficient to raise the adaptive qualification threshold above the fixed reference value. The output of comparator 50 enables AND circuit 48 to conduct the positive peak information only if peak-to-peak amplitude of this field is sufficiently high. Comparator 50 has no effect on qualified peak detection of negative signal peaks resulting in the pulse stream at the output of AND circuit 47, that is used in inverted readback mode, so as to allow very low amplitude signals to pass as may be required when reading poorly written high mark density patterns within the RLL encoded customer data field in a high lineal density format.

In summary, the above-described qualified peak detector includes AND circuit 48 for non-inverted signal processing (FIG. 5 waveforms) for supplying positive signal transitions representing local signal peaks that exceed the line 37 signal amplitude qualification threshold. Similarly, AND circuit 47, in inverted signal processing, supplies positive signal transitions representing local signal peaks that exceed the line 37 signal amplitude qualification threshold. The above description defines an analog qualified peak detector that operates for both inverted and non-inverted signal processing.

Read flag field circuit 55 operation is timed by a clock (not shown) in circuits 12 for indicating scanning a flag field portion of a sector on disk 10. Other controls (not shown) in circuits 12 may inhibit checking for a recorded flag field, such as when scanning to a target sector or reading data, for example. The flag field track location is determined by timing from a signal read from the disk in the Sector ID field such as the sector mark or address marks. Circuit 55 can be a usual flip-flop or other bistable circuit that is switchable between a binary one state (inverted signal processing) and a binary 0 state (non-inverted signal processing). While processing pulses in the inverted signal processing mode, read flag field circuit 55 keeps electronic switch 29 closed, as indicated by connection to control line 57. Then, the line 27 AGC feed back (FB) signal travels through AGC feedback circuitry 30 and onto capacitor 28 for controlling the gain of VGA 25. VGA 25 supplies an amplitude stabilized output signal. When flag field circuit 55 is actuated to read the later-described flag field, then electronic switch 29 is opened for disconnecting the AGC feedback. Then VA 25 acts as a constant gain amplifier. Circuits 12 also actuate flag field circuit to again close switch 29 upon completing the read back of the flag field, i.e. resets circuit 55 to the inverted signal processing state.

It is to be understood that in practicing the present invention, flag field circuit 55 can be replaced by other control circuits (not shown). Such circuits selectively, either manual or programmed, respond to read back signal characteristics, error rates and the like, for switching between processing inverted replicas of the read back signal or non-inverted replicas of the read back signal.

Simultaneously to circuit 55 actuating electronic switch 27 to open, polarity multiplexor 20 and detector multiplexor 50 are actuated from the inverted to the non-inverted signal processing states. Multiplexor 20 in the inverted signal processing mode passes the differential signal carried on lines 18 and 19 through in the inverted readback polarity (as illustrated by read signal 70 in FIG. 3) while in the non-inverted mode passes the differential signal through in the non-inverted readback polarity (as illustrated by read signal 90 in FIG. 4). Detector multiplexor 51, the receiver of the inverted and non-inverted signal processed pulse signals, also switches operating states and degates the inverted channel pulse stream from AND circuit 47 and passes the non-inverted channel pulse stream from AND circuit 48 as is apparent from the illustrations and associated descriptions of FIGS. 4 and 5.

FIG. 3 diagrammatically illustrates format of one addressable sector 60 of disk 10. Disk 10 has a large multiplicity of such addressable sectors. A gap 61 separates the data portion of one sector from the sector ID of the following adjoining sector. Sector ID (identification) 62 is an embossed area having the usual sector mark, sector address, clock synchronizing pulse bursts, cyclic redundancy codes, and the like. Portion 62 is embossed into the land between the grooves at the same lineal density and using the same RLL code as the data portion will be written at. Following the sector ID is gap 69 which precedes flag field 65. Following the flag field is gap 64 which is followed by automatic laser power calibration (ALPC) field 63 which is a two byte field useful for correcting the laser power control immediately preceding the write of Data Portion 66. Flag field 65 is usually written at the highest mark density pattern allowed by the RLL code which is used to encode the sector ID and data portion. For the unbanded (1X) and banded (2X) industry standards this is a 100100 . . . or 3T pattern of the (2,7) RLL code being recorded as PPM marks. Such a pattern is a monotonous pulse stream or tone. D=2 means that a minimum spacing on the optical disk of two bit positions without any pulses in bit positions (see FIG. 7) between two adjacent ones of the pulses. K=7 indicates that each modulation code character has 7 bit positions. For the 4X banded format, maximum pulse repetitive frequency is represented by the pulse tone of 1010 . . . or 2T pattern of the (1,7) RLL code. Data portion 66 stores marks written at the same lineal density as the marks within the flag field 65, but the mark density varies within the constraints determined by the RLL code from the highest density or 3T pattern (for the (2,7) code) to the lowest density or 8T pattern. "T" indicates one encoded channel bit period. In PPM ablative recording, a mark is written at the position of each 1 during recording and on readback the reflection will be the lowest as the spot scans over the center of each written mark. The reflection minimums are then processed to create the signal peaks which are away from the reference baseline for a usual or non-inverted read channel and, towards the reference baseline for the inverted read channel. In either case the peaks of interest are in a single direction. This is referred to as being "unipolar". In the flag field marks are written at the highest mark density or every 3 bit periods for PPM recording using the (2,7) RLL code.

For the most reliable signal processing of every format field, sector ID 62 should be read in the inverted signal processing mode, then in gap 69 the read channel could be switched to non-inverted signal processing for processing of flag field 69. The read channel 31 operation could then be switched back to the inverted signal processing mode during the time frame indicated by bracket 68 (which includes gap 64 and ALPC 63) for read processing of data portion 66. Some operations do not require that all signal-processing switching be effected. For example, during the write pass of sector 60 it is important to read flag field 65 in the non-inverted mode for most reliable flag field detection, but the state of the read channel during the write of ALPC field 63 and data portion 66 may not be important. The sector ID on this first write pass could be detected in inverted mode for most reliable ID recognition, but could also be processed in non-inverted mode to stress the read process against poorly embossed marks in the sector ID with the intention of reassigning this sector if the ID embossing is marginal. Similarly on the second pass of the write operation, when the flag field is being written, it is not important what state the read channel is in when traversing the flag field. And as before sector ID 62 and data portion 66 may be most advantageously be read using inverted read channel detection or may be deliberately stressed against poor embossing or writing by use of non-inverted read channel detection. For medium scan operations where it is important that the flag field is detected most reliably, non-inverted read channel is required, but depending on the technique used, determination of written feature content in data portion 66 may be independent of signal polarity, again allowing for unswitched operation. Finally, in read mode when for high reliability processing of the data portion calls for inverted read channel processing, flag field detection is not an issue and it does not matter in which mode the read channel processes the flag field. Thus, the channel signal processing could be dynamically switched as each sector is traversed to maintain the most reliable signal processing mode for each format field. Alternately, the channel could be statically switched between signal processing modes depending on the operation being performed on the given pass over a sector.

For continuous switching, the sector format is programmed into the FIGS. 1, 2 and 8 illustrated devices, the timing for switching between inverted and non-inverted signal processing is at the boundaries between sector ID 62 in gap 69 and between flag field 65 in gap 64. Timing operation of circuits to match format timing is known and not detailed for that reason.

FIG. 4 illustrates non-inverted signal processing. Non-inverted read back signal into VGA 25 carries data which can be detected for conversion into pulse stream 87. Qualification threshold 71 is generated by envelope threshold circuit 36. Qualification threshold 71 tends to follow variations in read back signal amplitude indicated by envelope signal 72. Maximum amplitude peaks 75 and 77 each represent a binary 1 signal. "A" signal 80 indicates the portions of read back signal 70 having an amplitude greater than the qualification threshold, i.e. output from comparator 45. Differentiated signal 81 is carried on line 41 and is used for binary one detection (detect peaks 75 and 77) by detecting zero axis crossings 82 (comparator 46). Signal 83 is the output of comparator 46. Data signal 87 is the output of AND circuit 47 which is conducted through to line 58 by detector multiplexor 51 when in non-inverted signal processing mode. Numeral 84 indicates an area of signal 83 that is ambiguous as to data content while glitch labeled 85 and 88 indicates an error. Such errors can occur frequently at poorly embossed or written high mark patterns within a record encoded with an RLL code at high lineal recording densities, as in gaps 67 and 69 (FIG. 3). These errors may occur when the read back non-inverted signal 70 represents a high mark density pattern where the signal amplitude valleys between adjacent read back signal peaks does not go below the dynamic detection threshold signal 71 amplitude, as at point 78. Such phenomenon creates detection reliability problems at the high lineal density recording. At lower or the medium lineal density recording such phenomena are less likely or do not occur. This error mechanism is the reason that inverted read channel processing is preferred for data portion 66 data readback. Numeral 93 indicates signal base line.

FIG. 5 shows inverted read back signal processing for the same data pattern as used in the FIG. 4 illustration. The input signal to VGA 25 is the inverted polarity of the differential signal on lines 18 and 19. Operation of the DC restore circuit 23 is to keep the signal peaks at the baseline 93. Because signal peaks are guaranteed to occur at least every 8T for a (2,7) RLL code, the peak amplitude can be accurately restored. In this case the qualification threshold varies due to pattern as is shown in signal 90 where an extended string of zeros causes the signal to reach its full zero (0) value, while high mark density strings of signal 90 keep the signal from even approaching the full 0 value due to inter-symbol interference from the nearby ones. The signal polarity of inverted read back signal 90 is opposite of the signal polarity of non-inverted read back signal 70. To detect data carried by the inverted read back signal 90, minimum amplitude peaks 94 are detected to each indicate a binary one data signal. As such, qualification threshold 91 is maintained such that all peaks 94 are separated by an amplitude excursion of the inverted read back signal 90 below the detection threshold 91. This phenomenon enables more reliable data detection at the higher lineal writing densities. Because the tendency of this read detection mode is to place the qualification threshold in the middle of a read back signal, then very low resolution 3T strings are still detectable. This signal processing is advantageous for recovering marginally written data encoded via an RLL code. It turns out that this type of signal processing is a poor signal detection technique for flag fields because it will tend to keep the threshold in the middle of media noise. When a flag field read back signal is shaped by the read equalizer easily leads to an undesired high frequency pulse stream not easily distinguishable from a flag field. Therefore, this signal processing is not used for flag field detection.

Inverted envelope signal 92 is shown for comparison with envelope signal 72. B signal 96 indicates when the inverted read back signal 90 has an amplitude which is above the qualification threshold. Data signal 97 illustrates the error free detection based on the inverted signal processing. Note that detector multiplexor 55 then conducts the output of AND circuit 48 that is similar to data signal 97 (FIG. 5) to line 58.

Figure 6:
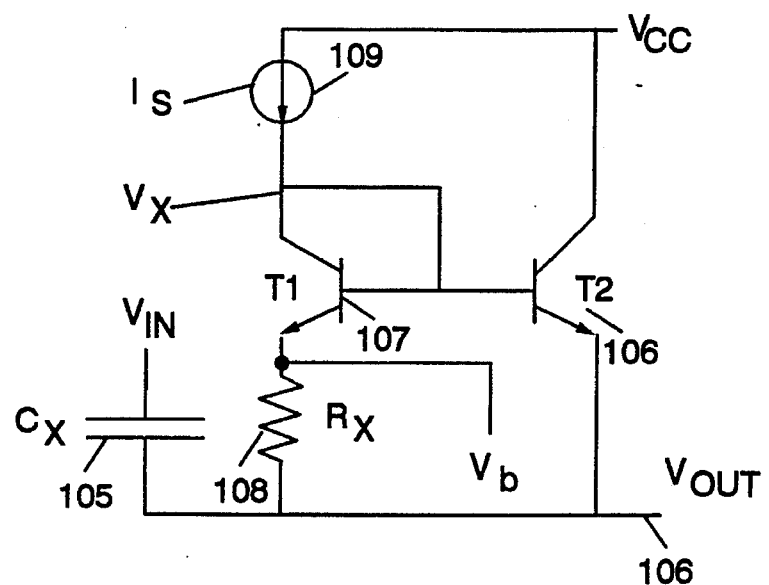
FIG. 6 is a circuit diagram of a DC restore circuit useful in practicing the present invention.

FIG. 6 illustrates a simple DC restore circuit such as may be used for DC restore block 23 of FIG. 2. Vcc is the usual power supply. Incoming signal Vin is coupled through capacitor Cx 105 which serves to provide a level shift from the DC voltage of the incoming signal Vx to the required baseline voltage desired on Vout on line 1061. In the absence of any AC signal at the input to this circuit, Vout will become the bias voltage Vb at the emitter of transistor T1 107 by the RC decay of Rx 108 and Cx 105. If the input signal Vin takes a negative excursion, the coupling action of capacitor Cx 105 tends to bring the output voltage Vout down. But, the circuit action of transistor T2 108 tends to dump electrical current into this node as required to maintain Vout at a voltage of no less than the input bias Vb. Transistor T1 107 is diode connected and is driven by current source Is 109 so that the emitter current through transistor 107 is substantially constant. This constant current through diode connected transistor T1 107 causes the base of transistor T2 108 to be maintained at one diode drop above the bias voltage Vb. If Vout is above Vb, transistor T2 108 is substantially nonconductive. If Vout attempts to drop below Vb, the base-emitter junction of transistor T2 108 becomes forward biased and transistor T2 108 conducts electrical current into the output voltage line 106. The action of this circuit is to maintain an output signal that has the AC content of the input signal Vin, but which DC shifts the signal so that its negative peaks are always at a baseline reference value Vb.

Figure 7:
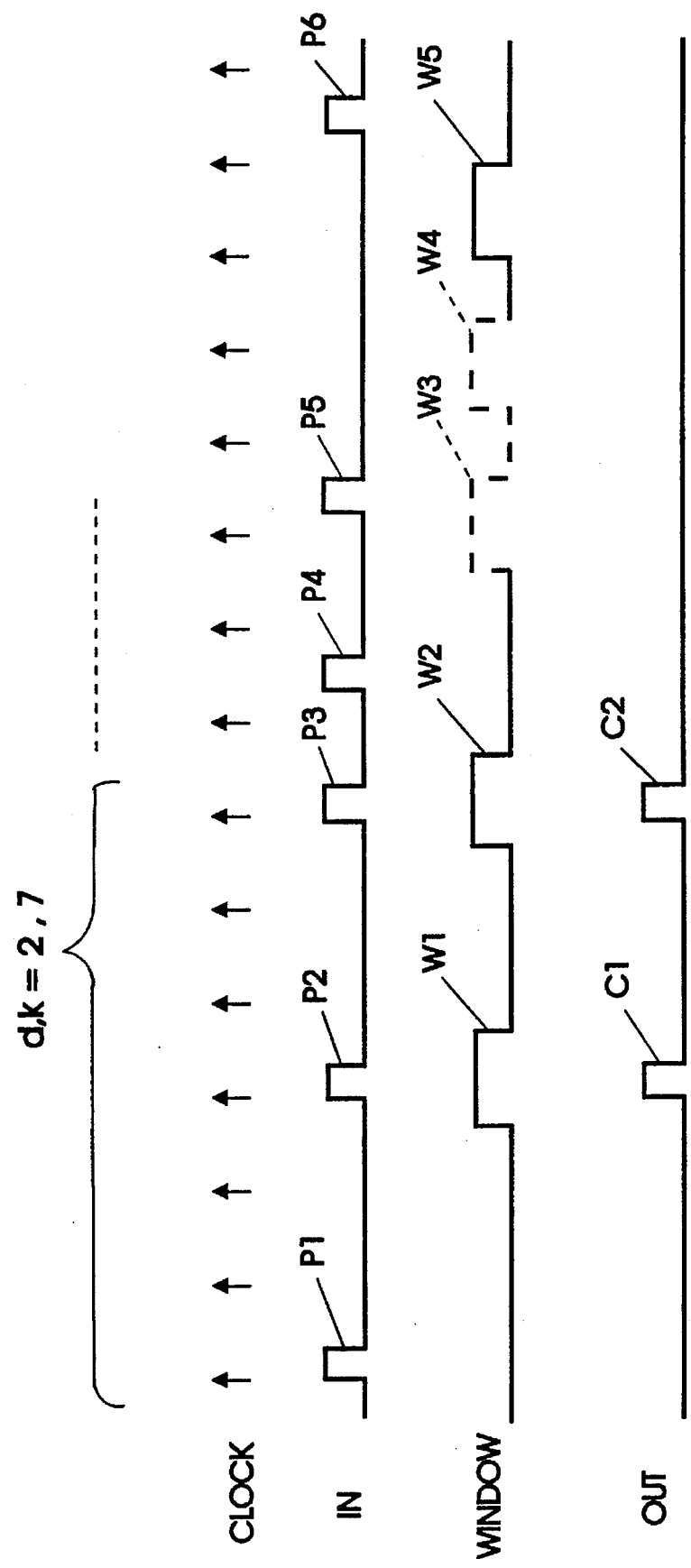
FIG. 7 is a timing diagram which illustrates the circuit function of the timing interval analyzer used in the FIG. 1 illustrated signal processing channel.

FIG. 7 timing diagram illustrates the operation of timing interval analyzer 21 of FIGS. 1, 2, 8 and 9. The top line has readback signal clock ticks (arrows) that provide a timing frame of reference. The signal labeled IN represents the readback pulse stream that might be seen on line 58 of FIG. 2 while the read laser beam is traversing flag field 65. Input pulse P1 triggers a timing window W1 on signal window centered three time clocks later to selectively pick out pulses which occur at 3T intervals in which flag field is written. Pulse P2 occurs at the expected 3T interval occurring synchronously with window W1. The signal labelled OUT is the logical AND of signals IN and WINDOW. This logic effectively gates out only those pulses which have the proper timing relative to the preceding pulse for counting as valid 3T pulses. Pulse P3 triggers a window shown in dashed lines as W3. W3 shows where the window would appear if the next pulse P4 did not arrive and retrigger the window single shot. Note that had the window not been reset, Pulse P5 would have been qualified or allowed to pass based on a window triggered by P3. Resetting the window generating circuit (not shown) on premature pulses is an important improvement to guard against a read detector chattering due to noise and generating non-stop pulses that are not 3T apart but which frequently may pass based on a window generated from a pulse which did not immediately precede the pulse being passed. P5 in turn resets the window which would have been generated by P4 and instead produces the window W5. P6 comes too late to be qualified by W5 and thus is not counted as a 3T pulse, though it in turn triggers the window generator to determine if it is the first of a series of 3T pulses.

Referring next to FIGS. 8 and 9, the replacement of some of the FIG. 2 illustrated analog circuits with digital circuits is described. The overall or general operation of the digital embodiment is similar to the analog embodiment operation. The differences will become apparent in the following description. The illustrated analog-to-digital interface in read detection channel 31 is diagrammatically illustrated in FIG. 8 by analog-to-digital converter ADC 34-A and digital-to-analog converter DAC 34-D. ADC 34-A converts the analog read back signal to a constant-repetitive-rate set of multi-bit digital signals while DAC 34-D converts a multi-bit gain control signal to an analog gain control signal.

The term "line" when used in describing the digital circuits includes multi-bit conductors in one line ;of the drawing. All signal processing intermediate ADC 34-A and DAC 34-D plus data detection is digital. The digital representation of the analog read back signal amplitudes from ADC 34-A is a succession of multi-bit digital value signals, such as one byte wide digital signals. The numeric value in each of the multi-bit digital value signals indicates the amplitude of the analog read back signal at respective samplings by ADC 34-A. This sampling uses known analog-to-digital sampling techniques. The later-described digital signal processing uses the succession of multi-bit wide digital signals. This succession of digital amplitude value signals is hereinafter referred to as a digital amplitude signal that is a digital read back signal.

ADC 34-A supplies the digital amplitude signal to known digital equalizer 26-D. Digital equalizer 26-D digitally processes the received digital amplitude signal to supply an equalized digital amplitude signal to detector 32-D, a digitized read back signal detector. Detector 32-D in the illustrated embodiment includes digital amplitude qualification circuit 110 that receives the line 35 equalized digital amplitude signal. Read back data are detected by arrival time estimator 111 as controlled by tracking threshold circuit 112. The detected data are sent to data synchronizer 22 for conversion into user data from the RLL codes used in the recording. The line 35 equalized digital amplitude signal goes to arrival time estimating circuit 111 while signal output of amplitude qualification circuit 110 is supplied to tracking threshold cirucit 112. The operation of ciruits 111 and 112 is described in the document incorporated by reference, U.S. Pat. No. 5,315,284 Bentley et al.

Digital flag field detector 33-D receives the output of amplitude qualification circuit 110 for detecting presence of a recorded flag in a flag field 65. Flag field detector 33-D includes digital time interval analyzer 14-D and digital event threshold clircuit 21-D, both as best seen in FIG. 9.

Digital control of automatic gain control circuit 34 is achieved by gain adjustment circuit 113, also illustrated in FIG. 9. Gain adjustment circuit 113 replaces AGC FB 30, switch 29 and capacitor 28 of the FIG. 2 illustrated embodiment. The output of gain control cirucit 113 is applied over line 156 via DAC 34-D to VGA 25 (FIG. 2) in automatic gain control 34. DAC 34-D digitally stores a multi-bit gain value. Gain adjustment circuit 113 supplies gain increment and decrement value signals (one bit wide) over line 156 to DAC 34-D. DAC 34-D responds to the increment/decrement value signal to adjust its stored digital value (not shown) to output a changed analog gain control signal to VGA 25. This analog control signal sets VGA 25 operation to a corresponding gain value, i.e. is a steady-state gain control signal. Gain adjustment circuit 113 responds to the digital amplitude signal to adjust the gain of VGA 25. In a preferred embodiment, VGA 25 is adjusted once for each sector to be accessed. In another embodiment, VGA 25 is held at a constant gain value while scanning the flag field 65 while other data in each sector are read using a continuous digital gain adjustment, as will become apparent. In yet another embodiment, circuit 113 adjusts gain at power up time during an initial calibration for a session of accessing sectors on disk 10. Such reduced gain adjustment may include adjusting gain after certain detected error conditions. Such detected error conditions may be an unrecoverable data error, predetermined read back data errors and the like.

Referring next to FIG. 9, digital amplitude qualification circuit 110 includes two digital peak amplitude detectors 120 and 121. Digital peak detectors 120 and 121 respectively respond to the line 35 equalized digital amplitude signal to detect the positive and negative peak amplitudes of the line 35 equalized digital amplitude signal. For detecting a maximum value positive signal value, peak detector 120 detects a maximum value indicating a peak amplitude. Similarly, digital peak detector 121 detects a minimum negative amplitude value for detecting a negative signal peak. The digital peak detectors effect peak detection once each cycle of equalized digital amplitude signal as indicated by the signal values passing through a zero value twice. Multi-bit digital adder 122 subtracts the outputs of the peak amplitude detectors 120 and 121 to obtain a digital peak-to-peak read back signal amplitude value. This subtraction is represented in the drawing by the "+" and "−" inputs to multi-bit digital adder 122. Multi-bit digital amplitude comparator 124 compares each digital peak-to-peak value with an multi-bit digital amplitude qualification threshold value on line 125. Digital amplitude comparator 124 supplies signal IN of FIG. 7 to tracking threshold circuit 112 and time interval analyzer 21-D. Digital time interval analyzer 21-D processes the IN signals of FIG. 7 as does time interval analyzer 21 of FIG. 2. Similarly, event threshold circuit 14-D detects a recorded flag signal (event) as does event threshold circuit 14 of FIG. 2.

Time interval circuit 21-D includes digital length counter 130 for counting the IN pulses of FIG. 7 for qualifying length of each amplitude qualified peak. Counter 130 sends its count to comparators 131 and 135. While flag field 65 is being scanned for detecting a flag signal, qualified peak length counter 130 is enabled, by the line 27 signal to measure amplitude-qualified peak lengths.

To ensure that the recorded flag signal has a length between a maximum pulse length indicated on line 132 and a minimum pulse length indicated on line 136, comparators 131 and 135 respectively compare the length counter 130 count with the lines 132 and 136 thresholds. AND circuit 140 responds to both comparators 131 and 135 simultaneously emitting a threshold-meeting signal for indicating that the qualified signal peak is between the maximum and minimum pulse length thresholds. AND circuit 140 may also be enabled by the line 27 signal for passing a qualified peak indicating signal to digital event threshold circuit 14-D.

Digital event threshold circuit 14-D includes qualified peak counter 145 that counts the number of amplitude and length qualified peak signals detected and indicated by digital time interval analyzer 21-D. Comparator 146 compares the current count value of qualified peak counter 145 with flag threshold value on line 147. If the qualified peak counter 146 value is greater than the flag threshold value, then comparater 146 issues a flag detected signal to microprocessor 12 (FIGS. 1 and 8).

Gain adjustment circuit 113 automatically controls the gain of VGA 25. Peak-to-peak amplitude averaging circuit 150 receives from summer 122 and averages a predetermined number of the received multi-bit peak-to-peak multi-bit digital value signals. Averaging circuit 150 emits an averaged multi-bit amplitude value signal to comparators 151 and 152. Comparator 151 issues a high-amplitude approval signal so long as the averaging cirucit 150 emitted averaged value signal (B input to comparator 151) is less than a predetermined high threshold multi-bit value on line 154. If B>A in comparator 151, then a gain-decrement signal is supplied to DAC 34-D that subtracts one from its stored digital gain value signal for reducing the gain of VGA 25. Similarly, If B>A in comparator 152, comparator 152 emits an increment value signal over line 156 to DAC 34-D for incrementing the gain of VGA 25. OR circuit 153 connects comparaters 151 and 152 to line 156. In this described arrangement, VGA 25 provides a constant signal amplitude gain so long as the equalized amplitude signal has an amplitude between the high and low thresholds on lines 154 and 155.

In a preferred embodiment, gain of VGA 25 is adjusted once each disk sector. Peak-to-peak amplitude averaging circuit 150 automatically maintains an average peak amplitude value derived from the summer 122 emitted value signals. Microprocessor and other circuits 12 detect and indicate onset of a sector. Each sector ID 62 begins with a sector mark. Upon detecting a sector mark during reading or writing, microprocessor and other circuits 12 send a sector mark control signal via OR circuit to peak-to-peak amplitude averaging circuit 150 to emit its averaged amplitude signal. Comparators 151 and 152 receive the emitted averaged amplitude signal for determining whether or not the gain of VGA 25 is to be adjusted as described above.

In a similar manner, microprocessor and other circuits 12 may actuate peak-to-peak amplitude averaging circuit to initiate adjustment of VGA 25 gain upon detecting an error condition, beginning of a read or write session of the recorder, and the like. The respective control signals "error" and "session mark" travel through OR circuit 160 to peak-to-peak amplitude averaging circuit 150. It is also possible to continuously adjust AGC 25. For such continuous amplitude monitoring, line 27 is connected by line 157 to OR circuit 153 for blocking all the increment and decrement signals while the flag field is being scanned for sensing a recorded flag signal. Other controls for effecting control of VGA 25 may also be employed.

While the invention has been particularly shown and described with reference to preferred embodiments thereof, it will be understood by those skilled in the art that various changes in form and details may be made therein without departing from the spirit and scope of the invention.

What is claimed is:

1. A method of signal processing a stream of pulse signals, including steps of:

selecting a source of said pulse signals that supplies interleaved groups of said pulse signals in said stream respectively having first ones of said groups having first ones of said pulse signals, said first ones of said pulse signals having variable repetitive pulse signal rate such that said variable repetitive pulse signal rate includes a pulse signal rate less than a predetermined maximum repetitive pulse signal rate, and second ones of said groups having second ones of said pulse signals having a given repetitive pulse signal rate not greater than said predetermined maximum repetitive pulse signal rate, data being carried in said pulse signals as amplitude peaks in said pulse signals;

first, receiving from said source for processing said first group of said variable rate pulse signals:

in said processing, first inverting signal polarity of said received first group pulse signals;

in said processing, detecting negative peaks of said inverted and received first group of pulse signals for indicating said data carried by said received first group of pulse signals;

second, indicating that said second group of said pulse signals are to be received and processed; and receiving and processing said second group of said pulse signals including detecting the positive peaks of said received second group of said pulse signals for indicating data in said received second group of said pulse signals.

2. The method set forth in claim 1, further including steps of:

in said processing said first group of said pulse signals, before said detecting step of detecting data in said first group of said pulse signals, amplifying said received first group of said pulse signals including automatically gain controlling said amplification for producing read back signals having a stabilized signal amplitude; and while said processing said second group of said pulse signals, before said detecting data carried by said second group of said pulse signals, amplifying said received second group of said pulse signals with a predetermined constant amplification gain.

3. The method set forth in claim 2, further including steps of:

converting said first and second ones of said pulse signals into a succession of multi-bit signal values, each said multi-bit signal value indicating a respective pulse signal amplitude of said first and second ones of said pulse signals;

selecting predetermined times in said succession of said multi-bit signal values; and at each said selected predetermined time, automatically adjusting said gain to be used in said amplifying step for said automatically controlling said amplification step.

4. The method set forth in claim 1, further including steps of:

establishing a signal amplitude peak qualifying threshold amplitude; and only in said step of detecting positive peaks comparing said second ones of said pulse signals with said threshold amplitude for indicating said data in said second group of said pulse signals while detecting said first ones of said signals without qualifying negative peak amplitude values.

5. The method set forth in claim 4, further including steps of:

in said establishing step, repeatedly measuring a peak-to-peak amplitude of said second ones of said pulse signals;

averaging said repeated measurements; and deriving said signal amplitude peak qualifying threshold amplitude from said averaged repeated measurements.

6. The method set forth in claim 1, including steps of:

before said first and second steps:

in said selecting step for selecting said source, selecting an optical disk having sector ID and data signals recorded in a data storing portion written on the disk at a high lineal density and including said selected optical disk in said source;

selecting said optical disk to have a plurality of addressable sectors, selecting each sector to have said sector ID and a flag field interposed between said sector ID and said data storing area; said flag field having said second group of said pulse signals, said sector ID having said first group of said pulse signals; and before recording data in said data storing portion, sensing said flag field for detecting said second group of said pulse signals, then responding to sensing said second group of said pulse signals, inhibiting writing in said data storing portion, otherwise recording data in said data storing portion.

7. The method set forth in claim 6, further including steps of:

in said signal processing of said second ones of said signals, for each one of said second groups read from said flag fields, respectively, measuring a total duration of said second ones of said signals for indicating said flag signal.

8. The method set forth in claim 6, including steps of:

in said signal processing of said first and second groups of said pulse signals:

deriving from said received pulse signals an envelope signal for indicating amplitude of said received pulse signals;

deriving from said received pulse signals a detection threshold signal;

establishing a predetermined data-indicating amplitude threshold for each said first and second groups of said received pulse signals;

comparing said envelope signal with said detection threshold signal, if said comparison indicate said envelope signal amplitude to be below said detection threshold signal amplitude, then aborting said procession of said received pulse signals.

9. The method set forth in claim 1, including steps of:

actuating said source of said pulse signals to be unipolar pulse signals;

detecting negative peaks of said received and inverted pulse signals of said first groups of pulse signals as data;

detecting positive peaks of said received pulse signals in said second groups as data;

actuating said source to supply said first and second pulse signals in digitally modulated sets of said first and second pulse signals in a (d,k) code wherein d is a minimum number of bit storing positions between two successive ones of said pulse signals, each said pulse signal occupying one of said bit positions and k being a number of said bit positions in each of said sets; and actuating said source to supply said second pulse signals as a set of pulse signals separated by "d" ones of said bit positions for creating a digital tone having a maximum pulse repetitive frequency in said (d,k) code.

10. The method set forth in claim 9, including steps of:

providing an optical disk having a plurality of addressable sectors for storing data;

each of said sectors having a sector ID, a flag field and a data-storing portion;

in each of said sectors, inserting a non-recording gap between said sector ID and said flag field;

scanning over said gap in each of said sectors before scanning said flag field; and switching said processing of said received pulse signals from processing said first groups of said pulse signals to said second groups of said pulse signals while scanning said gap.

11. The method set forth in claim 10, including steps of:

instituting a write operation to a given one of said sectors;

in said write operation, first sensing said sector ID of said given sector, then sensing said flag field of said given sector, if said sensing said flag field results in detecting said pulse signals in one of said second groups, aborting writing into said data-storing portion of said given sector; and instituting a read operation to said given one of said sectors;

in said read operation, first sensing said sector ID of said given sector, then sensing in said data-storing portion of said given sector for said pulse signals of a given one of said first ones of said groups of said pulse signals, 12. The method set forth in claim 11, including steps of:

limiting a repetition rate of said pulse signals in one of said first or second groups to be not greater than a predetermined maximum pulse repetition rate;

making all of said pulse signals in said one of said groups of pulse signals a monotone sequence of said pulse signals having said predetermined maximum pulse repetition rate;

then, in said write operation, sensing that said flag field of said given sector has none of said pulse signals in a given one of said groups of said pulse signals; and then recording data into said data-storing portion of said given sector and recording a given one of said second groups in said flag field in said given sector.

13. The method set forth in claim 12, further including steps of:

establishing a signal peak amplitude threshold value having a given signal polarity;

detecting and indicating a signal peak each time said pulse signals exceed said signal peak amplitude threshold value of said given polarity;

in said signal processing said second ones of said pulse signals in respective ones of said second groups, counting a number of said signal peaks; and after detecting a predetermined number of said signal peaks in any one of said second groups, indicating said flag signal.

14. The method set forth in claim 13, further including steps of:

establishing a minimal duration for each of said signal peaks;

in said step of detecting said signal peaks, measuring an elapsed time that said pulse signal exceeds said signal peak amplitude threshold value of said given polarity;

comparing said measured elapsed time with said minimal duration; and indicating said signal peak only if said comparison indicates that the measured elapsed time is greater than said minimal duration.

15. The method set forth in claim 1, further including steps of:

before said first and second steps:

automatically gain controlling signal amplitude of said first ones of said pulse signals for generating a amplified pulse signals;

establishing upper and lower amplitude criteria for said amplified pulse signals for creating an acceptable range of amplified signal amplitudes;

comparing the amplitude of predetermined ones of said first signals with said upper and lower amplitude criteria;

if said comparing step shows that the compared amplitude is greater than or less than said upper and lower amplitude criteria, respectively, then changing said automatically gain control to produce lower or greater gain, respectively, for changing said amplitude of said amplified pulse signals toward said acceptable range of amplified signal amplitudes.

16. The method set forth in claim 15, further including steps of:

converting said amplified pulse signals of said first group of pulse signals into a time succession of amplified-signal digital value signals, each said digital value signal indicating an amplitude of said pulse signals at respective different times in said time succession;

making said upper and lower amplitude criteria for said amplified pulse signals respective upper and lower threshold digital value signals;

in said step of comparing predetermined ones of said first signals, comparing respective predetermined ones of said time succession of amplified-signal digital value signals with said upper and lower threshold digital value signals; and in said step of changing said automatically gain control to produce lower or greater gain, respectively, changing said gain by a given digital value for changing said amplitude of said amplified pulse signals toward said acceptable range of amplified signal amplitudes.

17. The method set forth in claim 16, further including steps of:

before said comparing step, generating a peak-to-peak digital value signal for each of said first predetermined ones of said digital value signals;

in said comparing step, digitally averaging said peak-to-peak digital value signals of said first predetermined ones of said digital value signals to create an averaged value peak-to-peak digital value signal, then comparing said averaged peak-to-peak digital value signal with said digital upper and lower amplitude criteria, if said comparing step shows that the compared averaged peak-to-peak digital value signal is respectively greater than or less than said digital upper and lower amplitude criteria, then changing said automatically gain control to produce lower or greater gain, respectively, for changing said amplitude of said amplified pulse signals toward said acceptable range of amplified signal amplitudes.

18. The method set forth in claim 17, further including steps of:

in said selecting step, selecting an optical disk as a portion of said signal source, selecting said optical disk to have a plurality of addressable sectors, each sector having a sector ID, a data-storing portion and a flag field interposed between said sector ID and said data-storing portion;

scanning said optical disk for accessing said sectors by respectively traversing a scanning beam first over said sector ID, then said flag field and then said data-storing portion; and adjusting said gain once each time one of said sectors is scanned for accessing.

19. The method set forth in claim 17, further including steps of:

in said selecting step, selecting an optical disk as a portion of said signal source, selecting said optical disk to have a plurality of addressable sectors, each sector having a sector ID, a data-storing portion and a flag field interposed between said sector ID and said data-storing portion;

scanning said optical disk for accessing said sectors by respectively traversing a scanning beam first over said sector ID, then said flag field and then said data-storing portion;

in said selecting step, establishing a session for accessing said sectors in said optical disk;

before accessing any one of said sectors in said session, scanning predetermined ones of said sectors for producing said multi-bit digital value signals for adjusting said gain for making said amplified signal amplitude to be between said upper and lower amplitude criteria.

20. The method set forth in claim 19, further including steps of:

while scanning one of said sectors, detecting a predetermined error; and in response to said detected error, performing said steps of comparing the amplitude of predetermined ones of said first signals for adjusting said gain.

21. The method set forth in claim 1, further including steps of:

before said first receiving step, automatically gain controlling signal amplitude of said first ones of said pulse signals for generating a amplified pulse signals;

deriving a differentiated signal from said first ones of said pulse signals; and responding to said differentiated signal to adjust said automatic gain controlling said first ones of said pulse signals.

22. Signal processing apparatus for processing pulse signals, first ones as said pulse signals exhibiting variable pulse repetitive frequencies up to a predetermined maximum pulse repetitive frequency, second ones of said pulse signals exhibiting said predetermined maximum pulse repetitive frequency as a pulse tone; said pulse signals having maximal amplitude peaks that respectively indicate data being carried by said first and second ones of said pulse signals;

an improvement, including in combination:

source means for supplying said first and second ones of said pulse signals in respective first and second time-interleaved groups;

signal processing means having first, second and third signal means;

said first signal means being connected to said source means for receiving and processing said first ones of said pulse signals;

first detecting means in said first signal means for receiving and detecting data carried in said first ones of said pulse signals;

said second signal means connected to said source means for receiving and processing said second ones of said pulse signals;

second detecting means in said second signal means and connected to said source means for receiving said second ones of said pulse signals for detecting maximum amplitude peaks of said received second pulse signals for indicating a predetermined one datum contained in said second ones of said pulse signals; and said third signal means connected to said source means and to first and second signal means for transferring said first ones of said pulse signals supplied by said source means to said first signal means and for transferring said second ones of said pulse signals supplied by said source means to said second signal means and for indicating, respectively, that said first and second ones of said pulse signals are being transferred to said first and second signal means.

23. Apparatus as set forth in claim 22, further including, in combination:

amplifying means in said source means, said amplifying means having a first automatic-gain-control mode of operation and a second constant gain mode of operation; and said source means being responsive to said third signal means indicating said first ones of said pulse signals to actuate said amplifying means to operate in said first mode and being further responsive to said third signal means indicating said second ones of said pulse signals to actuate said amplifying means to operate in said second mode.

24. Apparatus as set forth in claim 22, further including, in combination:

automatic gain control means electrically interposed between said source means and said signal processing means for receiving said pulse signals and amplifying said received signals and being connected to said third signal means for supplying amplified first and second ones of said pulse signals to said first, second and third signal means;

criteria means for establishing upper and lower amplitude criteria for said amplified pulse signals for creating an acceptable range of amplified signal amplitudes;

amplitude comparing means connected to said criteria means and to said signal processing means for comparing the amplitude of predetermined ones of said first signals with said upper and lower amplitude criteria to generate a gain control change signal if said amplified pulse signal is greater or less than said upper and lower criteria, respectively; and gain adjustment means in said automatic gain control means connected to said amplitude comparing means for responding to said gain control change signal to change gain of said automatic gain control means to respectively produce lower or greater gain if said amplitude comparator indicates that the amplified pulse signal is greater than or less than said upper and lower criteria for changing said amplitude of said amplified pulse signals toward said acceptable range of amplified signal amplitudes.

25. Apparatus as set forth in claim 24, further including in combination:

said source means having an optical disk having a plurality of addressable sectors, each sector having a sector ID, a data-storing portion and a flag field interposed between said sector ID and said data-storing portion;

means in said source means for scanning said optical disk for accessing said sectors by respectively traversing a scanning beam first over said sector ID, then said flag field and then said data-storing portion;

sector means connected to said source means for sensing and indicating onset of scanning any one of said sectors; and start means in said gain adjustment means connected to said sector means for responding to said indicated onset of scanning said any one of said sectors to adjust said gain of said automatic gain control means once in said any one of said sectors.

26. Apparatus as set forth in claim 24, further including in combination:

said source means having an optical disk having a plurality of addressable sectors, each sector having a sector ID, a data-storing portion and a flag field interposed between said sector ID and said data-storing portion;

means in said source means for scanning said optical disk for accessing said sectors by respectively traversing a scanning beam first over said sector ID, then said flag field and then said data-storing portion;

session means in said source means for indicating that a new sector-accessing session is beginning; and start means in said gain adjustment means connected to said session means for responding to said indicated new sector-accessing session is beginning to adjust said gain of said automatic gain control means once in said any one of said sectors.

27. Apparatus as set forth in claim 22, further including, in combination:

said source means having an optical disk device for mounting an optical disk having a plurality of sectors, each said sector having machine-sensible sector ID and a data storing portion for receiving and recording data, said sector ID and said data-storing portion for recording said first ones of said pulse signals;

a plurality of flag fields respectively in said addressable sectors, each of said flag fields in each of said sectors being interposed between said sector ID and said data storing area in each said sector; and said flag fields for receiving and recording predetermined ones of said second ones of said pulse signals.

28. Apparatus as set forth in claim 27, further including, in combination:

envelope means in said signal processing means and being connected to said first and second signal means for receiving both said inverted and non-inverted pulse signals for deriving from said inverted and non-inverted pulse signals an envelope signal for indicating amplitude of said read back signal;

detection threshold means in said signal processing means and connected to said first and second signal means for receiving both said inverted and non-inverted pulse signals for deriving from said inverted and non-inverted pulse signals a detection threshold signal;

degate means in said envelope means and having degate threshold means indicating a predetermined data-indicating amplitude threshold;

said degate means having comparing means for comparing said envelope signal with said minimal amplitude threshold and for indicating if said envelope signal amplitude is below said predetermined minimum amplitude threshold for degating said signal processing; and said first and second signal means respectively comparing said read back signal minimum and maximum amplitudes with said derived detection threshold signal for indicating data carried in said read back signal.

29. Apparatus as set forth in claim 28, further including in combination:

said optical disk having a plurality of addressable data-storing sectors, each said sector having a sector ID, a data-storing portion and a flag field interposed between said sector ID and said data-storing portion and being disposed in a track on the optical disk;

said source means having optical disk recording-sensing means relatively movable with respect to and in a recording and sensing operative relationship to said disk to sequentially scan said sectors in said track such that each sector ID is scanned before scanning said flag field and said data-storing portion for sensing and recording said pulse signals from and in said addressable sectors; and said source means being responsive to said third signal means for sensing said first ones of said pulse signals in said sector ID and said data-storing portion and sensing said second ones of said pulse signals in said flag field.

30. Apparatus as set forth in claim 22, further including in combination:

a digital-to-analog converter electrically interposed between said source means and said signal processing means for converting said pulse signals into a time succession of multi-bit digital value signals each of said multi-bit digital value signals having a value representative of one amplitude at a predetermined time of said pulse signals such that said time succession of said multi-bit digital value signals is a digital representation of amplitudes of said pulse signals;

digital equalizer means in said signal processing means for receiving said time succession of multi-bit digital value signals for equalizing said time succession of multi-bit digital value signals to generated a time succession of equalized multi-bit digital value signals;

digital amplitude qualification means in said signal processing means and connected to said digital equalizer means and to said first and second signal means for measuring peak-to-peak signal values and passing only those equalized multi-bit digital value signals having a digital value exceeding a predetermined amplitude threshold value as qualified peak-to-peak digital signals of said first and second ones of said pulse signals;

said first signal means receiving said qualified peak-to-peak digital signals of said first ones of said pulse signals for detecting data contained therein;

said second signal means receiving said qualified peak-to-peak digital signal of said second ones of said pulse signals for detecting said datum and indicating said datum as a predetermined flag signal.

31. Apparatus as set forth in claim 30, further including in combination:

said second signal means having pulse duration counting mean for receiving and counting a number of said successive qualified peak-to-peak digital value signals not separated by any gaps of no qualified peak-to-peak digital value signals, digital comparator means in said second signal means having maximum and minimum length criteria digital value signals and comparing said counted qualified peak-to-peak digital value signals for indicating only a number of said continuous qualified peak-to-peak digital value signals as qualified peak digital signals;

qualified peak counter means connected to said digital comparator means for counting a number of said qualified peak digital signals for indicating said flag signal; and flag compactor means having a qualified peak threshold value and being connected to said qualified peak counter means for receiving said count of said qualified peak digital signals for indicating said flag signal only if said count of said qualified peak digital signals exceeds said qualified peak threshold value.

32. Apparatus as set forth in claim 31, further including in combination:

automatic gain control means electrically interposed between said source means and digital to analog converter for receiving said pulse signals and amplifying said received signals and being connected to said third signal means for supplying amplified first and second ones of said pulse signals to said first, second and third signal means;

gain adjustment means electrically interposed between said digital amplitude qualification means and said automatic gain control means for receiving said qualified peak-to-peak digital signals for supplying gain adjusting digital signals to said automatic gain control means;

criteria means in said gain adjustment means for establishing upper and lower amplitude criteria for said amplified pulse signals for creating an acceptable range of amplified signal amplitudes;

digital amplitude digital signal comparing means in said gain adjustment means and connected to said criteria means and to said qualified peak-to-peak digital signals for comparing the amplitudes indicated in predetermined ones of said qualified peak-to-peak digital signals with said upper and lower amplitude criteria to generate a gain control adjustment signal if said qualified peak-to-peak digital signals indicate an amplitude greater or less than said upper and lower criteria, respectively; and gain changing means in said automatic gain control means connected to said digital amplitude digital signal comparing means for responding to said gain control adjustment signal to change gain of said automatic gain control means to respectively produce lower or greater gain if said amplitude comparator indicates that the amplified pulse signal is greater than or less than said upper and lower criteria for changing said amplitude of said amplified pulse signals toward said acceptable range of amplified signal amplitudes.

33. Apparatus as set forth in claim 32, further including, in combination:

said source means having an optical disk, said optical disk having a plurality of addressable data-storing sectors, each said sector having a sector ID, a data-storing portion and a flag field interposed between said sector ID and said data-storing portion;

said source means addressably accessing said sectors by respectively traversing a scanning beam first over said sector ID, then said flag field and then said data-storing portion;

said signal processing means having sector means connected to said source means for detecting and indicating an onset of scanning any one of said sectors for producing a sector mark signal;

said gain adjustment means having start means connected to said sector means for responding to said sector mark signal to actuate said gain adjustment means to adjust said gain once.

34. Apparatus as set forth in claim 32, further including, in combination:

said source means having an optical disk, said optical disk having a plurality of addressable data-storing sectors, each said sector having a sector ID, a data-storing portion and a flag field interposed between said sector ID and said data-storing portion;

said source means addressably accessing said sectors by respectively traversing a scanning beam first over said sector ID, then said flag field and then said data-storing portion;

said signal processing means having session means connected to said source means for initiating optical disk accessing sessions and indicating an onset of each said session for producing a session mark signal;

said gain adjustment means having start means connected to said session means for responding to said session mark signal to actuate said gain adjustment means to adjust said gain once.

35. Apparatus as set forth in claim 22, further including in combination:

said source means supplying all of said pulse signals as unipolar pulses;

said source means supplying said pulses in groups of (d,k) code groups, each of said code groups having said k of bit positions, each bit position for either having and not-having one of said unipolar pulses, said d of said bit positions being a minimum number of said bit positions between any two adjacent ones of said bit positions having one of said unipolar pulses; and said source means supplying said second ones of said pulse signals as a sequence of said unipolar pulses separated by said d number of bit positions whereby said second ones of said pulse signals being a constant digital tone having a maximum unipolar pulse repetitive frequency in each said (d,k) code group of said second ones of said pulse signals.

36. Apparatus as set forth in claim 35, further including in combination:

each of said addressable sectors having a gap of no-recording between said sector ID and said flag field; and said source means switching said signal processing from said first signal means to said second signal means while said sensing-recording means is scanning said gap.

37. Apparatus as set forth in claim 36, further including in combination:

write means connected to said signal processing means for actuating said signal processing means for writing data signals in said data-storing portion of a predetermined one of said addressable sectors;

said signal processing means actuating said first signal means to sense said sector ID of said predetermined one of said addressable sectors, actuating said second signal means to sense said flag field of said predetermined one of said addressable sectors;

said signal processing means having means for detecting said sensing of said second ones of said pulse signals while sensing said flag field and for actuating the signal processing means to abort recording in said data-storing portion whenever said second ones of said pulse signals are detected in said flag field, otherwise enabling said signal processing means to write data in said data-storing portion of said predetermined one of said addressable sectors.

38. Apparatus as set forth in claim 37, further including in combination:

said source means having pulse control means for limiting said pulse repetitive frequency to a predetermined maximum pulse repetitive frequency;

said source means supplying said first ones of said pulse signals having a plurality of predetermined pulse repetitive frequencies all of which are not greater than said predetermined maximum pulse repetitive frequency;

said source means supplying said second ones of said pulse signals in a mono-tone sequence of said pulse signals having said predetermined maximum pulse repetitive frequency; and said second signal means including a timed detector that has a detection window means for detecting said second ones of said pulse signals at said predetermined maximum pulse repetitive frequency.

39. Apparatus as set forth in claim 38, further including in combination:

said optical disk being a write-once read-many optical disk.

40. Apparatus for reading written signals from an optical disk having addressable sectors for storing said written signals, said written signals in each said addressable sector including first groups of said written signals having a variable lineal recording density below a predetermined maximum lineal recording density and second groups of said written signals having a monotonic stream of said written signals at said predetermined maximum lineal recording density;

an improvement including, in combination:

sensing means operatively coupled to said optical disk for sensing said both said written signals in said first and second groups of said written signals for producing a read back signal representative of said written signals in first and second groups of pulse signals respectively derived from said first and second written signals and respectively having a variable pulse repetitive frequency less than a predetermined maximum pulse repetitive frequency and said predetermined maximum pulse repetitive frequency for respectively representing said first and second groups of said written signals;

signal inversion means coupled to said sensing means for receiving said first and second groups of said pulse signals of said read back signal for supplying an inverted replica and a non-inverted replica of said first and second groups of said pulse signals in said read back signal respectively as first and second processed signals;

multiplexing means connected to said signal inversion means for receiving said first and second processed signals; output means in said multiplexing means for supplying only one of said first and second signals as a current processed signal;

variable gain amplifier means connected to said output means for receiving said current processed signal for amplifying said current processed signal to be an amplified signal;

equalizer means having first and second output lines and connected to said variable gain amplifier means for receiving said amplified signal for generating an equalized signal and a differentiated signal, respectively on said first and second output lines;

threshold means connected to said first output line for receiving said equalized signal for generating an envelope signal and threshold detection signal;

automatic gain control means connected to said variable gain amplifier and to one of said output lines for generating an AGC feedback signal and supplying said AGC feedback signal to said automatic gain control amplifier for varying amplification of said variable gain amplifier, hold means in said automatic gain control means for responding to a predetermined actuation signal to interrupt supplying said AGC feedback signal to said variable gain amplifier means for actuating said variable gain amplifier to have a constant signal amplitude gain;

gating network means connected to said first and second output lines and to said threshold means for receiving said differentiated signal to detect and indicate said maximum and minimum amplitude peaks respectively in said inverted and non-inverted pulse signals for generating data indicating signals;

state control means connected to said hold means, said multiplexing means and to said gating network means, said control means having state means for supplying first and second control signals for respectively actuating said multiplexing means to supply said first and second processed signals, actuating said variable gain amplifier to variably amplify said first processed signal and to amplify said second processed signal using said constant gain;

multiplexing control means in said state control means and connected to said state control means for responding to said first and second control signals for respectively selecting said first and second groups of signals in said read back signal to be said current processed signal; and AGC control means in said state control means and connected to said hold means for responding respectively to said first and second control signals for actuating said hold means to enable said AGC feedback and hold the feedback.

41. Apparatus as set forth in claim 40, further including in combination;

said automatic gain control means being connected to said first output line.

42. Apparatus as set forth in claim 40, further including in combination:

degating means in said gating network means connected to said threshold means for receiving said envelope signal;

said state control means having minimum amplitude means connected to said degating means and being responsive to said indication of onset of said low-frequency signals for supplying a minimum amplitude indicating signal to said degating means for actuating the degating means; and said degating means being responsive to said actuation to compare said minimum amplitude threshold signal with said envelope signal for degating said gating network means from generating said data indicating signals.

43. Apparatus as set forth in claim 42, further including, in combination:

said gating network means comprising:

reference means for supplying a reference signal;

first and second comparators, each said comparator having first and second inputs and positive and negative outputs;

first and second AND gates, said AND gate having a data input and an enable input and a datum output;

said first comparator first and second inputs being respectively connected to said threshold means for receiving said detection threshold signals and to said first output line for receiving said equalized signal;

said second comparator first and second inputs being respectively connected to said second output line for receiving said differentiated signal and to said reference means for receiving said reference signal;

said first comparator positive and negative outputs being respectively connected to said enabling inputs of said second and first AND gates; and said second comparator positive and negative outputs being respectively connected to said data inputs of said second and first AND gates.

44. Apparatus as set forth in claim 43, further including, in combination:

a data detector in said gating network means connected to said datum outputs of said first and second AND gates and to said multiplexor control means for responding respectively to said indications of onset of said high and low frequency pulse signals to respectively detect data indicated by said AND gates derived from said minimum and maximum amplitude peaks.

45. Apparatus as set forth in claim 44, further including in combination:

said first and second AND gates each having a degating input;

degating control means in said state control means connected to said threshold means for receiving said envelope signal;

comparator means in said degating control means, having means indicating a minimum amplitude threshold and having a comparator for comparing said envelope signal amplitude with said predetermined minimum amplitude threshold and being connected to both said degating inputs for degating the AND circuits only if said envelope signal is less than said minimum amplitude threshold, and said degating control means being responsive to said second control signal to activate said comparator means in said degating means.

46. Apparatus as set forth in claim 45, further including, in combination:

each said addressable sector having a first, second and third portions;

said first and third portions respectively storing sector identification and user data, both said first and third portions having said high lineal density signals; and said second portion being interposed between said first and third portions and storing flag field signals written as said low lineal density signals.

47. Apparatus for reading written signals from an optical disk having a plurality of addressable sectors for storing said written signals, said written signals in each said addressable sector including first groups of said written signals having a variable lineal recording density below a predetermined maximum lineal recording density and second groups of said written signals having a monotonic stream of said written signals at said predetermined maximum lineal recording density;

an improvement including, in combination:

sensing means operatively coupled to said optical disk for sensing said both said written signals in said first and second groups of said written signals for producing an analog read back signal representative of said written signals in first and second groups of pulse signals respectively derived from said first and second written signals and respectively having a variable pulse repetitive frequency less than a predetermined maximum pulse repetitive frequency and said predetermined maximum pulse repetitive frequency for respectively representing said first and second groups of said written signals;

automatic gain control means connected to said sensing means for receiving and amplifying said analog read back signal for generating an amplified read back signal having said first and second groups of said signals;

an analog-to-digital convertor connected to said automatic gain control means for receiving said amplified read back signal for deriving a time succession of multi-bit amplitude-indicating digital signals in respective first and second groups from said first and second groups of said amplified read back signal;

digital equalizer means connected to said analog-to-digital convertor for receiving said time succession of said multi-bit amplitude-indicating digital signals for generating a time succession of equalized multi-bit digital signals representative of said analog read back signal;

a digital amplitude qualification circuit connected to said digital equalizer means and having a qualified amplitude threshold means having a multi-bit amplitude threshold digital signal indicating a predetermined amplitude threshold, said digital amplitude qualification ciruict comparing said multi-bit amplitude threshold digital signal with each said equalized multi-bit digital signals for detecting predetermined ones of said equalized multi-bit digital signals that respectively indicate a signal amplitude exceeding said predetermined amplitude threshold as amplitude-qualified multi-bit digital signals;

data detector means connected to said amplitude qualification circuit for receiving said first groups of said amplitude-qualified multi-bit digital signals for detecting data;

flag detector means connected to said amplitude; qualification circuit for receiving said second groups of said amplitude-qualified multi-bit digital signals for detecting a flag signal datum in each of said second groups and for responding to detecting said flag signal datum for generating a flag signal detected signal;

gain adjustment circuit means connected to said amplitude qualification circuit for receiving said amplitude-qualified digital signals for generating a gain adjustment digital signal; and digital-to-analog converter means electrically interposed between said automatic gain control means and said gain adjustment ciruict means for supplying an analog gain control signal to said automatic gain control means and for receiving said gain adjustment digital signal for responding to said gain adjustment signal for supplying a changed analog gain control signal to said automatic gain control means.

48. Apparatus as set forth in claim 47, further including, in combination:

said digital amplitude qualification circuit having first and second digital amplitude-peak detectors, said first and second peak detectors for respectively detecting and indicating successive ones of maximum positive and negative values in said time succession of equalized multi-bit digital signals respectively indicating positive and negative peak amplitudes of said analog read back signal;

subtractive adding means in said digital amplitude qualification circuit and being connected to said first and second digital peak detectors for generating an absolute sum value multi-bit digital signal representing a peak-to-peak signal amplitude analog read back signal amplitude; and said multi-bit amplitude threshold digital signal representing a desired minimum analog signal peak-to-peak value.

49. Apparatus as set forth in claim 48, further including in combination:

said flag detector means including a peak-length circuit having a digital counter connected to said amplitude qualification circuit continuously counting a number of said amplitude-qualified multi-bit digital signals occurring in burst of said amplitude-qualified multi-bit digital signals as a peak-length counts;

said flag detector means including digital length threshold means indicating a maximum and a minimum acceptable peak length values expressed as a length count values; and said flag detector means including a peak-length digital comparator connected to said peak-length circuit for receiving said peak-length counts and connected to said digital length threshold means for receiving said minimum and maximum length count values and for comparing each one of said length count values with said minimum and maximum length count values for generating peak-detected indicating digital signals while said peak count length is between said minimum and maximum length count values for qualifying detection of said flag signal datum.

50. Apparatus as set forth in claim 49, further including in combination:

said flag detector means further having a qualified peak counter connected to said peak-length digital comparator for receiving and counting said peak detected digital signals;

said flag detector means further having a flag qualifying threshold means supplying a flag-qualifying peak-count multi-bit digital signal that indicates said flag signal datum as being a predetermined number of said peak-detected indicating signals; and said flag detector means further having a flag gating circuit connected to said flag qualifying threshold means and to said qualified peak counter for supplying a signal indicating said flag signal detected signal.

51. Apparatus as set forth in claim 49, further including in combination:

gain adjustment means electrically interposed between said digital amplitude qualification circuit and said automatic gain control means for receiving said absolute sum value multi-bit digital signals for generating and supplying gain adjusting digital signals to said automatic gain control means;

criteria means in said gain adjustment means for establishing upper and lower amplitude criteria for said amplified read back signal for creating an acceptable range of amplified read back signal amplitudes;

digital amplitude digital signal comparing means in said gain adjustment means and connected to said criteria means and to said subtractive adding means for receiving said absolute sum value multi-bit digital signals for comparing the amplitudes indicated in predetermined ones of said absolute sum value multi-bit digital signals with said upper and lower amplitude criteria to generate said gain control adjustment signal if said received absolute sum value multi-bit digital signals indicate an amplitude greater or less than said upper and lower criteria, respectively; and gain changing means in said automatic gain control means connected to said digital amplitude digital signal comparing means for responding to said gain control adjustment signal to change gain of said automatic gain control means to respectively produce lower or greater gain if said amplitude comparator indicates that the amplified pulse signal is greater than or less than said upper and lower criteria for changing said amplitude of said amplified pulse signals toward said acceptable range of amplified signal amplitudes.

52. Apparatus as set forth in claim 51, further including in combination each one of said addressable sectors having a sector ID, a data-storing portion and a flag field interposed between said sector ID and said data-storing portion;

said sensing means addressably accessing said addressable sectors by respectively traversing a scanning beam first over said sector ID, then said flag field and then said data-storing portion;

said sensing means having sector means for detecting and indicating an onset of scanning predetermined ones of said addressable sectors for producing a sector mark signal;

said gain adjustment means having start means connected to said sector means for responding to said sector mark signal to actuate said gain adjustment means to generate said gain adjustment signal once for adjusting said gain of said automatic gain control means such that said gain is adjusted once each time said sector mark signal is received by said gain adjustment means.

53. Apparatus as set forth in claim 51, further including, in combination:

each one of said addressable sectors having a sector ID, a data-storing portion and a flag field interposed between said sector ID and said data-storing portion;

said sensing means addressably accessing said sectors by respectively traversing a scanning beam first over said sector ID, then said flag field and then said data-storing portion;

said sensing means having session means for initiating optical disk accessing sessions and indicating an onset of each said session for producing a session mark signal;

said gain adjustment means having start means connected to said session means for responding to said session mark signal to actuate said gain adjustment means to generate said gain adjustment signal once for adjusting said gain of said automatic gain control means once.

* * * * *